United States Patent
Bauer et al.

(10) Patent No.: US 11,551,543 B2
(45) Date of Patent: Jan. 10, 2023

(54) SAFETY MONITORING SYSTEM

(71) Applicant: HOLLYMATIC CORPORATION, Countryside, IL (US)

(72) Inventors: Erik Bauer, Alto, MI (US); David Baarman, Fennville, MI (US)

(73) Assignee: HOLLYMATIC CORPORATION, Countryside, IL (US)

( * ) Notice: Subject to any disclaimer, the term of this patent is extended or adjusted under 35 U.S.C. 154(b) by 0 days.

(21) Appl. No.: 17/336,515

(22) Filed: Jun. 2, 2021

(65) Prior Publication Data
US 2021/0375121 A1 Dec. 2, 2021

Related U.S. Application Data

(60) Provisional application No. 63/033,546, filed on Jun. 2, 2020.

(51) Int. Cl.
| | |
|---|---|
| *G08B 23/00* | (2006.01) |
| *G08B 25/01* | (2006.01) |
| *G08B 25/00* | (2006.01) |
| *G06F 1/16* | (2006.01) |
| *G08B 21/04* | (2006.01) |

(52) U.S. Cl.
CPC .......... *G08B 25/016* (2013.01); *G06F 1/163* (2013.01); *G08B 21/0415* (2013.01); *G08B 21/0423* (2013.01); *G08B 21/0446* (2013.01); *G08B 25/001* (2013.01)

(58) Field of Classification Search
CPC .............. G08B 25/016; G08B 21/0415; G08B 21/0423; G08B 21/0446; G08B 25/001; G06F 1/163

USPC ...................................................... 340/573.1
See application file for complete search history.

(56) References Cited

U.S. PATENT DOCUMENTS

| | | | | |
|---|---|---|---|---|
| 7,256,686 | B2 * | 8/2007 | Koutsky | B60N 2/0244 |
| | | | | 340/576 |
| 7,798,004 | B2 * | 9/2010 | Lueschow | G01H 3/14 |
| | | | | 701/50 |
| 2012/0112903 | A1 | 5/2012 | Kaib et al. | |
| 2015/0019280 | A1 * | 1/2015 | Mejegard | H04W 4/80 |
| | | | | 705/7.23 |
| 2017/0273374 | A1 * | 9/2017 | Howland | B25F 5/00 |
| 2018/0108241 | A1 * | 4/2018 | Wong | B25F 5/00 |
| 2019/0083022 | A1 | 3/2019 | Huang | |
| 2019/0236924 | A1 | 8/2019 | Iwamoto | |

\* cited by examiner

*Primary Examiner* — Naomi J Small
(74) *Attorney, Agent, or Firm* — Sughrue Mion, PLLC

(57) ABSTRACT

A wearable device and a system that includes the wearable device is provided. The wearable device includes at least one sensor configured to sense a characteristic of a user, a communication interface configured to obtain a first identifier of a vehicle or equipment, and a controller. The controller is configured to monitor the user based on the first identifier or send the first identifier to a monitoring system; determine whether there is a harm possibly occurring to the user of the wearable device based on at least one output from the at least one sensor, or send the at least one output to the monitoring system via the communication interface; and output, after the harm is determined to be possibly occurring, an alarm based on receiving confirmation from the user, or based on not receiving any confirmation from the user within a predetermined amount of time.

19 Claims, 15 Drawing Sheets

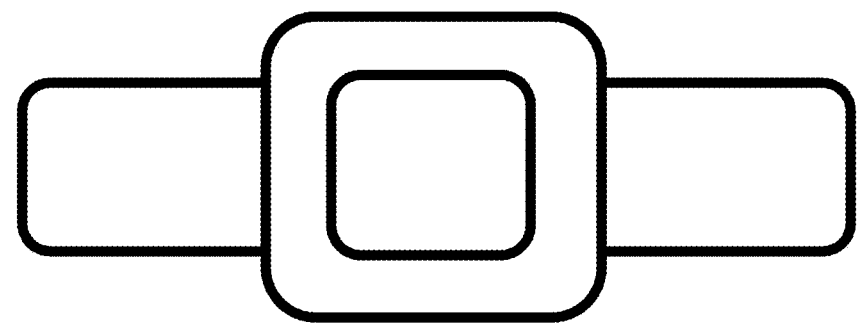
FIG. 1

FIG. 5

Building: North Warehouse 223
User: Tom Welling
Device: 22134
Shift: $2^{nd}$
Status: Active
Equipment: Bandsaw
Alarms: None
Location: Department 2

165

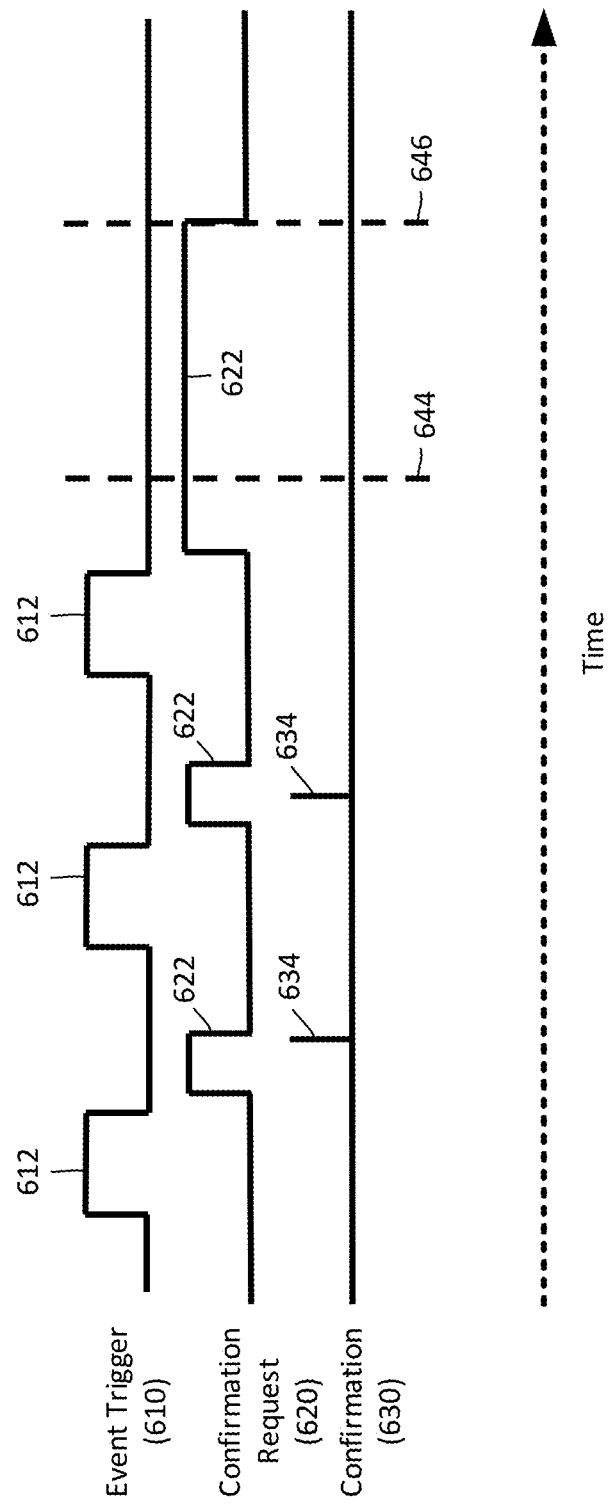

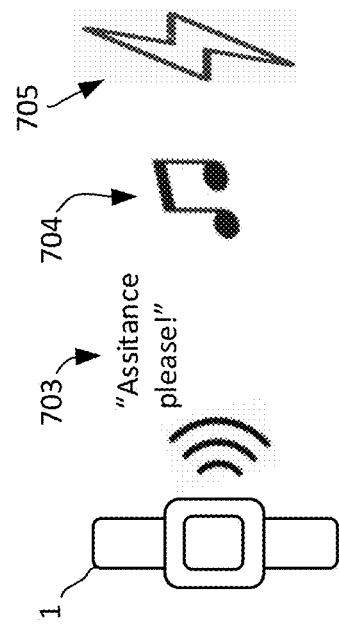
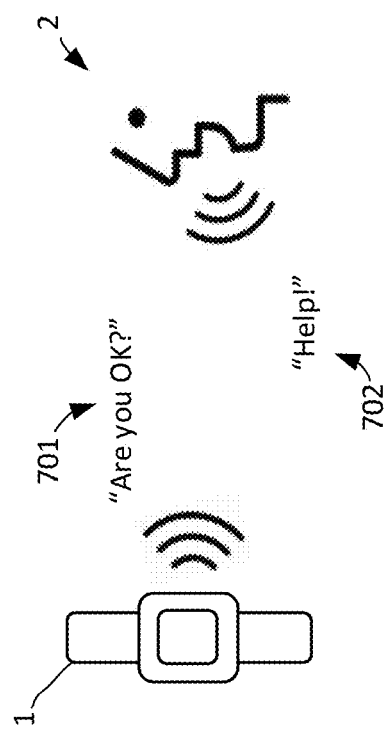
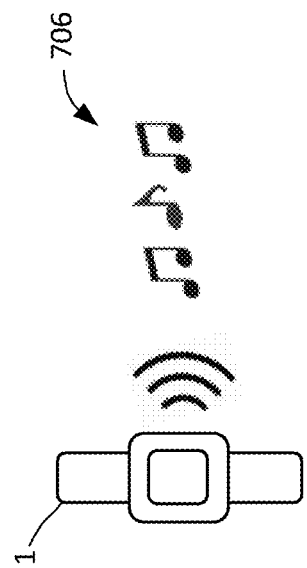
FIG. 11A
FIG. 11B
FIG. 11C

SAFETY MONITORING SYSTEM

CROSS-REFERENCE TO THE RELATED APPLICATION

This application claims priority from U.S. Provisional Application No. 63/033,546, filed on Jun. 2, 2020, the disclosure of which is incorporated herein by reference in its entirety.

FIELD

Embodiments of the present disclosure relate to a safety monitoring platform, and more particularly to systems and methods associated with monitoring health and safety of employees and responding to changes in behavior and sensor data.

Embodiments of the present disclosure relate to a safety monitoring platform, and more particularly to systems and methods associated with monitoring health and safety of employees and responding to changes in behavior and sensor data.

BACKGROUND

A system for safety monitoring people in working trackable environments around trackable equipment is to provide responses for health and safety. Safety issues affect millions of people across the world and add billions of dollars to insurance and mitigation costs annually. Lack of adequate safety tracking continues to present a significant business and personal risk. A variety of efforts have been made to track personal health and report personal status along with associated risks. For example, there is increasing interest in tracking personal activities in daily environments using wearables, including the growing use of personal wearable systems to perform repeated tracking of personal activity and health inputs. There are currently a number of different types of wearable products available on the commercial market. Many conventional wearable products suffer from a variety of shortcomings. For example, localized tracking has a tendency to depend on GPS resolution. As a result, conventional wearable products may have the unintended consequence of not being able to track and locate, with adequate resolution (e.g., within feet), specific activities and locations.

SUMMARY

Some embodiments of the present disclosure are generally directed to a safety monitoring platform that provides an intelligent, automated tracking system that performs continuous monitoring to detect events that indicate a person warrants help and automatically flags these events without assistance from a user.

One aspect of the present disclosure is generally directed to a wearable device and method for pulse oxygen pattern analysis and oxygen intensity tracking as it relates to accelerometry activity. Wearable devices, according to embodiments of the present disclosure, may include a battery and a system for wirelessly charging the battery. The wearable devices may be worn in manufacturing in shifts for specific periods of time. A battery of the wearable devices can be sized to last at least one shift so that systems of the present disclosure can overcome issues associated with monitoring data for days of usage, and allow the system to have more features with greater accuracy in, for example, tracking activities and locations and determining events. The wearable devices may have a certain width to cover sensors of the wearable devices within a shaded area to enhance the capability of the sensors. Wearable devices, according to embodiments of the present disclosure, may include soft breathable foams that surround the sensor(s) and presses softly against the skin blocking external light from the sensor(s). Accordingly, the wearable devices may enable better sensor readings while being comfortable.

Another aspect of the present disclosure generally relates to location tracking of a person wearing the wearable device. According to embodiments of the present disclosure, a wearable device and method can include pattern recognition, which allows detection of events based on patterns in sensor output. Specific events can be detected in response to detecting a specific combination of sensor output from different sensors. Event or flag-based fall detection, oxygen and pulse limit detection, work effort detection, and movement detection can be provided based on sensor output patterns and may initiate triggers and event timers for the user and a monitoring system to track. According to embodiments of the present disclosure, the wearable devices may detect specific events based on a specific composition of inputs like pulse rising with activity and oxygen levels. The wearable devices may compare the inputs to corresponding values during typical activity for a given health profile of a user. The wearable devices may include, for example, accelerometers and gyroscopes as sensors. Multi-axis accelerometry and gyro inputs may be used for detect falls of the user, to detect patterns indicating normal use by the user, and to detect movement as a confirmation of, for example, that a user is okay. The wearable devices may, for example, detect two taps on the wearable device or shaking of a wrist of a user as confirmation that the user is ok. The wearable devices may be configured to determine responses and statuses of a user based on any series of gestures. According to embodiments, a system that includes the wearable device may be provided, the system may be configured to track parameters about a user (e.g. information corresponding to inputs of the sensors of the wearable device), actively set limits and typical thresholds (e.g. upper and low thresholds), and determine when the user has exceeded the limits and the thresholds by comparing the limits and the thresholds to the parameters. The system may be configured with a delay time that is a time the system waits in determining whether there is a human response as a part of a verification control loop. A human response may include a voice response or a physical touch, that is detected by the wearable device, to verify that the user is okay. The human response may be used by the system to validate thresholds and provide feedback that is tracked in a cloud. Detection methodology can be improved with redundant event detection based on different sensor output of the wearable device(s).

According to another aspect of the present disclosure, the wearable device may include a radio-frequency identification (RFID) reader and the wearable device may be associated with a user by the RFID reader (and/or another sensor) reading information from the badge. For example, the system may include cloud memory storage that includes a record for each of one or more wearable devices, including the wearable device, and the system may be configured to pair the record of the wearable device with a user based on the RFID reader of the wearable device reading information from the badge of the user. Accordingly, cloud records of the wearable devices may be easily associated with users (e.g. employees), and such associations may be easily changed. In such case, it may be unnecessary for the users to use only a specific wearable device, and a plurality of the wearable device may easily be charged. For example, while the plurality of the wearable devices are charging, an employee may take any one of the plurality of the wearable device on the fly, and the wearable device taken may be associated to the employee (e.g. to an employee ID) through the wearable device being touched to a badge of the employee. Accordingly, the wearable device may be reusable and interchangeable, and may allow immediate setup and transfer to users (e.g. employees).

According to another aspect of the present disclosure, systems of the present disclosure may include one or more "watch dog" to ensure a user checks in within a period of time after an output of one or more sensors changes. For example, a first watch dog may include a first level of alarm and indicate a request to occur. If, for example, the first watch dog is not reset via voice, physical touch, or a gesture of the user to be sensed by the wearable device, the system may cause a secondary level of alarm and indicate a request to occur as, for example, a second watch dog. In some embodiments, normal activity (e.g. walking, working, or moving) by the user of the wearable device may change a priority level (e.g. level of alarm) of the system, and the normal activity may be monitored and logged by the system when the normal activity occurs. If activity corresponding to the user slows or changes, a higher priority alert may be triggered. This alarm may include remotely shutting off equipment, vibration of the wearable device, audible alarms (e.g. using speakers), and/or flashing lights to assure the user complies with the second notice. In a case where the second watch dog is not reset, a third watch dog may be triggered. The system, during the third watchdog, may set a response team in motion (e.g. medical personnel, a 911 internal response team), and flag a location of the user based on, for example, the location of the wearable device. According to embodiments, any number and order of the one or more watch dog can be controlled based of deviation of parameters (e.g. information corresponding to inputs from the sensors of the wearable device) from thresholds and rate of change of the parameters. If a change of a parameter is severe, the system may cause a response team to be notified after a user fails to respond to an initial watch dog (e.g. the first watch dog). In other words, the third watch dog may be triggered in place of the second watch dog, or both the second watch and the third watch may be triggered simultaneously. The system may be configured to enable response protocols and processes, including when certain watch dogs are triggered and what functions occur during each watch dog, to be set (e.g. programmed) by each organization that includes users (e.g. a company or a division of the company). Such information (e.g. response protocols and processes) may be stored as settings of the organization within an organization profile in memory. The system may be further configured to enable response protocols and processes to be set based on location (e.g. based on different buildings or different locations within a building) in which the wearable devices of the system are used. For example, the cloud memory storage may include different profiles for each organization and location which the system may associate with one or more of the wearable devices. The profiles may include the information set (e.g. response protocols and processes) as settings. The system may be configured to associate the profiles with the wearable devices based on user input to make the association, or dynamically by obtaining the location of the wearable devices, or information of the users of the wearable devices (e.g. via the RFID reader) that suggests the wearable devices are in a certain location and/or being used by a member of a certain organization.

According to another aspect of the present disclosure, the system may use multiple sensor inputs corresponding to a wearable device as a validation that the wearable device is in use and functional. For example, the sensor inputs may include body temperature, pulse, pulse oxygen conductivity across the skin, time of flight to skin, etc., and the wearable device may include any sensor that is configured to receive such inputs. The system may be configured to track a user's resting and working ranges and patterns and store such information in a profile of the user in, for example, the cloud memory storage. Accordingly, the system, via the profile, may obtain (e.g. determine) a person's physical limits and typical thresholds. This enables the user working ranges and thresholds to be analyzed utilizing artificial intelligence tools for optimal anomaly detection.

According to another aspect of the present disclosure, the system may include local location detection system. For example, the local location detection system may include an enhanced set of transceivers within a factory that assists in triangulating a location of a wearable device worn by the user, such that the system obtains the location of the user. The system may use the location of the wearable device as a location flag for identifying the position of the user upon an event. The system may be configured to track the timing of the event from trigger to location to deactivation or reset. The local location detection system may include a mesh network with zones, equipment locations, or Blue Tooth beacons, and signal strength information that are used for identifying specific areas of interest. The location system may use some or all of these methods to secure additional resolution of location. The local location detection system may be or include a triangulation system that is configured to detect specific locations of users, along with GPS for exterior locations. The system may obtain router IDs that correspond to routers in which the wearable devices communicate, and obtain a general location of the users/wearable devices based on the router IDs. LoRa and other radio system and signal strengths can also be a form of dead reckoning with additional triangulation as a dual location methodology.

According to another aspect of the present disclosure, the system may be configured to communicate with factory equipment. Information indicating events such as equipment emergency stops, touch stops, and operational abnormalities may be obtained by the system via the communication with the factory equipment, and the system may be configured to trigger functions (e.g. one or more watch dogs) to check on the user of a wearable device of the system. For example, based on detecting the event from the information, the system may immediately trigger a communications channel to be opened (e.g. between the wearable device of the user and a monitoring system of the system) and await for a response by the user indicating a status of the user, while the monitoring system validates the user is not in shock and the pulse oxygen of the user is acceptable, based on sensor outputs of the wearable device.

According to another aspect of the present disclosure, systems may collect typical pulse, oxygen, and activity data of a user via, for example, the wearable device worn by the user, and obtain baselines of body performance of the user in comparison with activity performance of the user therefrom. The system may gather such data, and statistically obtain a baseline of such data so that the system characterizes the user over time. In an embodiment, the longer the system is used the better the user is characterized. Accordingly, by obtaining and using such data, the system may identify when the user of the wearable device is not okay, and trigger different functions based on the condition of the user. This baseline data may include over the day, over the week, and/or seasonal data.

According to one or more embodiments, a system is provided. The system includes a vehicle or equipment and a wearable device. The vehicle or equipment includes a non-transitory computer readable medium including a first identifier of the vehicle or equipment. The wearable device includes: at least one sensor configured to sense a characteristic of a user while the user wears the wearable device; a communication interface configured to obtain the first identifier from the vehicle or equipment; and a controller including at least one processor and memory. The controller is configured to monitor the user based on the first identifier or send the first identifier to a monitoring system via the communication interface, determine whether there is a harm possibly occurring to the user of the wearable device based on at least one output from the at least one sensor, or send the at least one output to the monitoring system, via the communication interface, to determine whether the harm is possibly occurring, and output, after the harm is determined to be possibly occurring, an alarm based on receiving confirmation from the user by the wearable device, or based on not receiving any confirmation from the user within a predetermined amount of time.

According to one or more embodiments, a wearable device is provided. The wearable device includes: at least one sensor configured to sense a characteristic of a user while the user wears the wearable device; a communication interface configured to obtain a first identifier of a vehicle or equipment from the vehicle or equipment; and a controller including at least one processor and memory. The controller is configured to: monitor the user based on the first identifier or send the first identifier to a monitoring system via the communication interface, determine whether there is a harm possibly occurring to the user of the wearable device based on at least one output from the at least one sensor, or send the at least one output to the monitoring system, via the communication interface, to determine whether the harm is possibly occurring, and output, after the harm is determined to be possibly occurring, an alarm based on receiving confirmation from the user by the wearable device, or based on not receiving any confirmation from the user within a predetermined amount of time.

According to one or more embodiments, a method performed by at least one processor is provided. The method includes: obtaining a first identifier of a vehicle or equipment from the vehicle or equipment; and monitoring a user of a wearable device based on the first identifier and at least one output from at least one sensor of the wearable device, the at least one sensor configured to sense a characteristic of the user while the user wears the wearable device. The monitoring includes: determining whether there is a harm possibly occurring to the user of the wearable device based on the at least one output from the at least one sensor of the wearable device, and causing, after the harm is determined to be possibly occurring, an alarm to be output by the wearable device based on the wearable device receiving confirmation from the user, or based on not receiving any confirmation from the user within a predetermined amount of time.

These and other aspects, advantages, and features of embodiments of the present disclosure will be more fully understood and appreciated by reference to the description of non-limiting example embodiments and the drawings.

Before non-limiting example embodiments of the present disclosure are explained in detail, it is to be understood that the present disclosure is not limited to the details of operation or to the details of construction and the arrangement of the components set forth in the following description or illustrated in the drawings. Aspects of the present disclosure may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the embodiments of the disclosure to any specific order or number of components. Nor should the use of enumeration be construed as excluding from the scope of the present disclosure any additional steps or components that might be combined with or into the enumerated steps or components. Any reference to claim elements as "at least one of X, Y and Z" is meant to include any one of X, Y or Z individually, and any combination of X, Y and Z, for example, X, Y, and Z; X and Y; X and Z; and Y and Z. The use of "or" has the same meaning as "and/or", unless expressly stated to the contrary.

BRIEF DESCRIPTION OF THE DRAWINGS

FIG. 1 illustrates a wearable device according to an embodiment.

FIG. 5 is an example illustration of information displayed by a monitoring system, according to an embodiment

FIG. 10 illustrates a representative timing diagram of a system according to an embodiment.

FIG. 11A illustrates a first example sequence according to an embodiment.

FIG. 11B illustrates a second example sequence according to an embodiment.

FIG. 11C illustrates a third example sequence according to an embodiment.

DETAILED DESCRIPTION

Directional terms, such as "front," "rear," "vertical," "horizontal," "top," "bottom," "upper," "lower," "inner," "inwardly," "outer" and "outwardly," are used to assist in describing embodiments of the present disclosure based on the orientation of embodiments shown in the illustrations. The use of directional terms should not be interpreted to limit aspects of the present disclosure to any specific orientation(s).

Figure 2:
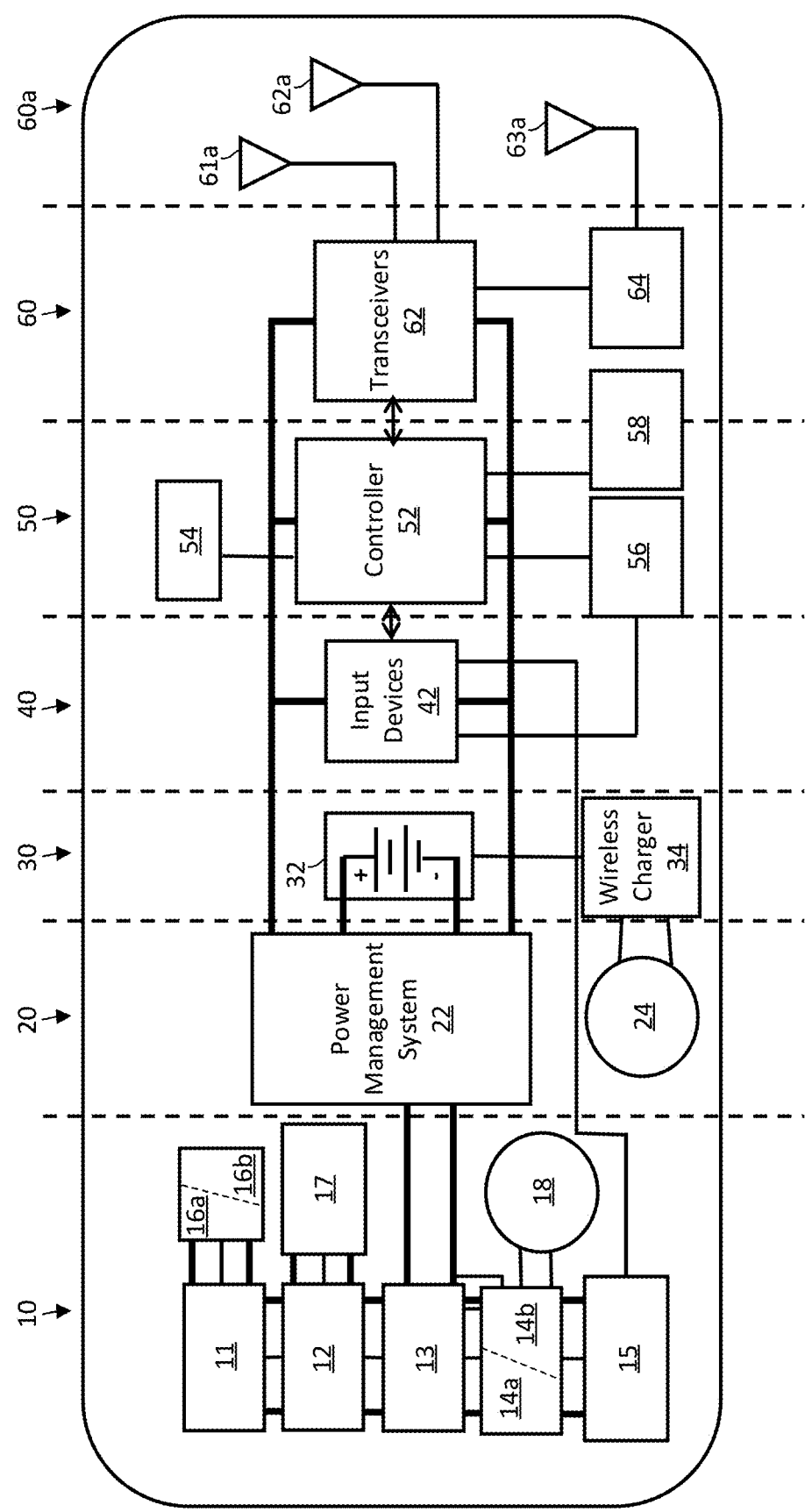
FIG. 2 is a diagram of a configuration of the wearable device, according to an embodiment.

With reference to FIG. 1, a wearable device 1 is illustrated that may be configured to be worn by a user. For example, the wearable device 1 may have a shape of a watch, and may be configured to be worn on a wrist of the user. However, the wearable device 1 may have any shape and may be configured to be worn on any part of a user. The wearable device may be configured for tracking and monitoring individual users for sensor thresholds and events. Referring to FIG. 2, the wearable device 1 may comprise a sensor & switch system 10, a power system 20, a battery system 30, an input system 40, a control system 50, and a communication system 60 that includes an antenna system 60a.

The sensor & switch system 10 may include a sensor & switch array, including an array of safety monitoring equipment. For example, the sensor & switch array may comprise at least one accelerometer 11 (e.g. multi axis accelerometer), at least one gyroscope 12 (e.g. multi axis gyroscope), at least one pulse oxygen sensor 13 (see FIG. 12 for an example of a pulse oxygen sensor), at least one tracking system 14a (e.g. an indoor/outdoor GPS coordinate system), an identification system 14b for identification of a user, an emergency & reset switch(es) 15, a time of flight sensor 16a, at least one temperature sensor 16b, and a microphone 17. The at least one tracking system 14a may include components of a GPS system and a factory triangulation system. The identification system 14b may include, for example, an RFID reader with an RFID coil 18. Each sensor and switch in the sensor & switch system 10 may be configured to input sensing or switching information to a controller 52.

The power system 20 may include, for example, a power management system 22 and a wireless power charging coil 24. The battery system 30 may include a battery 32 and a wireless charger 34. According to embodiments, the power system 20 and the battery system 30 may be, together, considered a single power system. The power management system 22 may be configured to distribute power to each component of the wearable device 1 as required. For example, the power management system 22 may selectively send power from the battery 32 to components based on a shift of safety monitoring requirements (e.g. specific components need power to input or output information). The wireless charger 34 may be configured to charge the battery 32. The wireless charger 34 may be, for example, an inductive type charger with the wireless power charging coil 24. The battery 32 may have an energy storage size based on the length of time the wearable device 1 is to be typically used during, for example, a user's shift, and intervals between multiple shifts of one or more users who may use the wearable device 1.

The input system 40 may include one or more inputs devices 42. According to embodiments, the one or more input devices 42 may include, for example, a capacitive touch sensor and/or a USB input interface. Each sensor and switch of the input system 40 may be configured to input sensing or switching information to the controller 52. According to embodiments, the sensor & switch system 10 and the input system 40 may be, together, considered a single input system.

The control system 50 may include, for example, the controller 52, an encryptor 54, output devices 56 and a display 58. The controller 52 may be configured to control components of the wearable device 1. For example, the controller 52 may send commands to components of the wearable device 1 other than the power management system 22, and/or control the power management system 22 to control power supplied to other components of the wearable device 1 to function in a particular manner. The controller 52 may receive outputs from the sensor & switch system 10, the input system 40, and the communication system 60 to obtain, for example, risk data and information about a user, and control the components of the wearable device 1 based on one or more of such outputs. For example, the controller 52 may monitor temperature information (e.g. ambient, source, & uP), acceleration information, capacitive information, and voltage information outputted from the sensors to the controller 52. Based on a user input sensed by one or more of the sensors, the controller 52 may control one or more of the output devices 56, which may include lights, haptics, and/or speakers, and/or the display 58 to provide user feedback. The controller 52 may also be configured to externally communicate with devices and systems outside the wearable device 1 via the communication system 60 of the wearable device 1. The controller 52 may be configured to perform voice recognition and/or stress detection of the user by receiving inputs from the microphone 17 of the sensor & switch system 10. The controller 52 may be configured to identify whether a user is wearing the wearable device 1 based on one or more of the time of flight sensor 16a and the one or more temperature sensors 16b. The one or more temperature sensors 16b may be used for identifying the user. The controller 52 may be configured to detect specific events based on one or more inputs (e.g. sensor outputs) to the controller 52 from the sensor & switch system 10 (and/or the input system 40). Alternatively or additionally, another part of a system (e.g. the monitoring system 160 described below), may perform any number of the identification, recognition, and detection functions of the wearable device 1. For example, the wearable device 1 may send any amount of data obtained by the wearable device 1 (e.g. data received from the sensor & switch system 10 and/or the input system 40) to the another part of the system, such that one or more of the identification, recognition, and detection functions are performed externally in the another part, and the another part of the system may determine how to control, and control, the wearable device 1 based on the externally performed functions.

The controller 52 may comprise at least one processor with memory that stores computer instructions configured to cause the at least one processor to perform the functions of the controller 52. At least a portion of the memory may be non-volatile memory (e.g. flash memory). The controller 52 may also comprise a real time clock.

As previously mentioned, the output devices 56 may include lights, haptics, and/or speakers to provide user feedback. The lights (e.g. LEDs) may light to indicate information based on control by the controller 52. The haptics may be configured to cause a haptic sensation to the user to indicate specific communications from the wearable device 1, based on control by the controller 52. The speakers may be configured to output a loud audible alarm to get the attention of the user to a request for an input by the user and/or to alert others to a position and condition of the user.

The display 58 may be, for example a touch display. The display 58 may display information to the user of the wearable device, based on control by the controller. In embodiments, the display 58, when a touch display, may also function as a part of the input system 40.

The encryptor 54 may be, for example, a crypto chip configured to encrypt data and prevent hacking. According to embodiments, the encryptor 54 may be implemented by the controller 52.

The communication system 60 may include, for example, 5G, WiFi, BTLE, Mesh, LoRa, and/or other communications systems. For example, the communication system 60 may include transceivers 62 including antennas (e.g. mesh/WiFi antenna 61a and/or LoRO/GPS antenna 62a), and/or a cellular module 64 with a cellular antenna 63a (e.g. 5G module with antenna).

Figure 3:
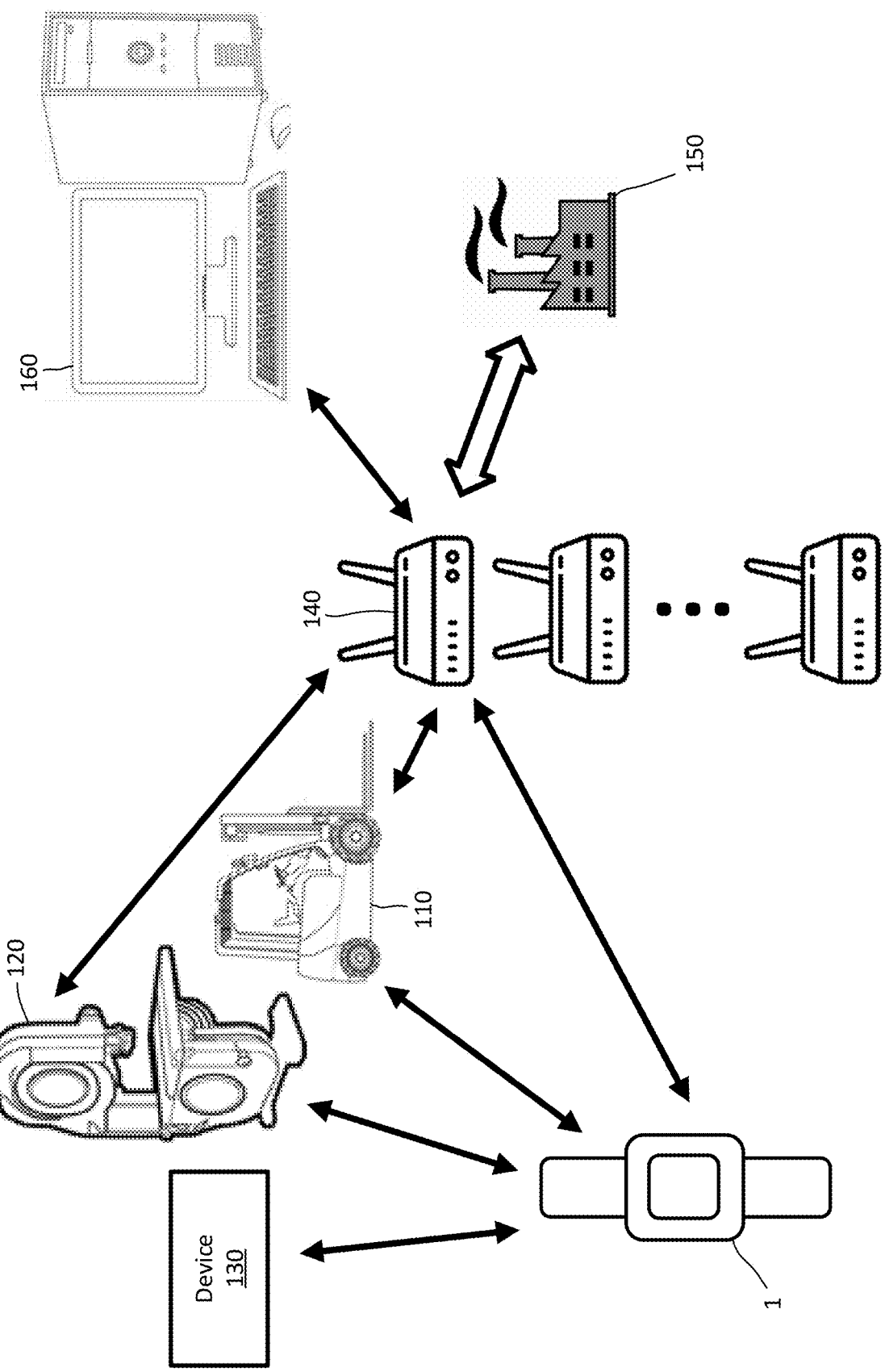
FIG. 3 illustrates a system including the wearable device, according to an embodiment.

FIG. 3 illustrates a diagram of a system 100 according to an embodiment. The system 100 may include factory equipment and interfaces that communicate data. For example, the system 100 may comprise one or more of the wearable device 1 described above, one or more vehicles 110 with communication interfaces, and equipment 120 with communication interfaces. The equipment 120 may be equipment that is used in processing (e.g. manufacturing). In the present disclosure, the term "equipment" refers to a device operated by a user, excluding vehicles.

The communication interfaces of the vehicles 110 and equipment 120 may include, for example, wireless communication interfaces that include one or more of a transmitter and/or receiver and/or tag (e.g. passive RFID tag). The communication interfaces may alternatively or additionally include wired communication interfaces. The communication interfaces of the vehicles 110 and equipment 120 may transmit an ID thereof that may be received by one of the wearable devices 1, such that the wearable device 1, or other parts of the system, may identify that the user of the wearable device 1 is nearby and/or using a particular vehicle 110 or equipment 120. For example, an RFID reader of the wearable device 1 may read an equipment ID 220 (refer to FIG. 4) of the equipment 120 or a vehicle ID 210 (refer to FIG. 4) of the vehicle 110 when the wearable device 1 is tapped on or otherwise nearby the communication interface of the vehicle 110 or equipment 120. Alternatively or additionally, the communication interfaces of the one or more vehicles 110 and equipment 120 may be configured to receive an ID of a nearby wearable device 1 by the nearby wearable device 1 outputting its ID (e.g. the wearable device ID 201 in FIG. 4) with an antenna of the communication system 60 of the wearable device 1, and receivers of the communication interfaces of the vehicles 110 or equipment 120 configured to receive the ID of the wearable device. For example, the communication interfaces of the vehicles 110 or equipment 120 may include the RFID reader.

Figure 4:
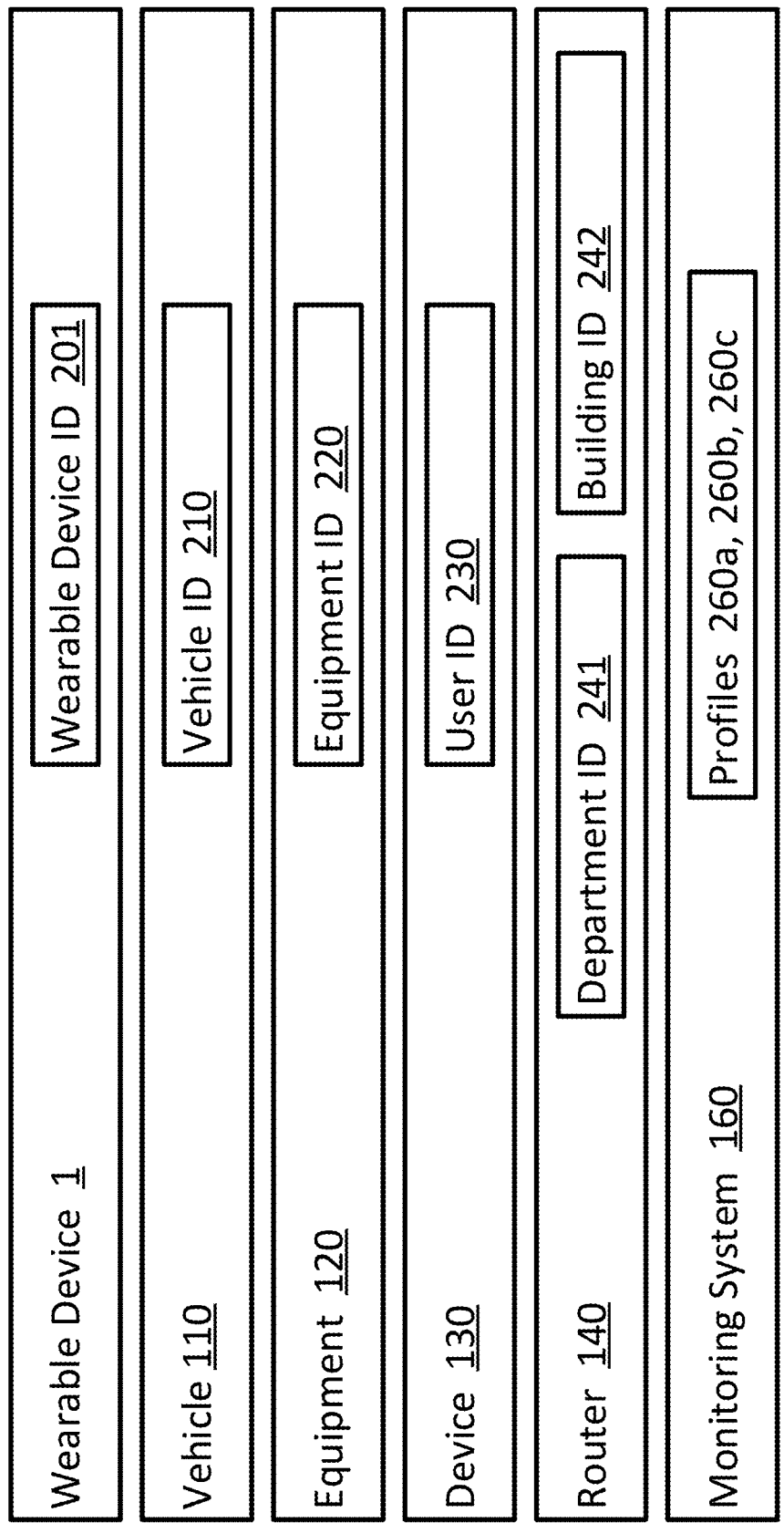
FIG. 4 is a diagram illustrating identifiers and profiles stored within the system, according to an embodiment.

In embodiments, the system 100 may further comprise a device 130 (e.g. an employee badge/ID) of an individual that includes a communication interface (e.g. a circuit configured as a passive or active RFID tag) that outputs an ID of a user (e.g. user ID 230 of FIG. 4). The RFID reader of the wearable device 1 may read the ID of the device 130 of the individual when the wearable device 1 is tapped on or otherwise nearby the communication interface of the device 130. Accordingly, the wearable device 1, or other parts of the system 100, may identify that the individual is the present user of the wearable device 1. According to an embodiment, the device 130 may be a phone of the user that stores the ID of the user, and the wearable device 1 may be configured to obtain the ID of the user from the phone via the communication system 60 of the wearable device 1. For example, the communication system 60 of the wearable device 1 may be configured to communicate with the phone to receive the ID of the user. Accordingly, the wearable devices 1 may be reusable and interchangeable, and may allow immediate setup and transfer to users (e.g. employees).

In embodiments, the system 100 may further comprise one or more routers 140 that are configured to wirelessly communicate with the communication system 60 of each of the wearable devices 1 when in range. Each of the routers 140 may comprise memory that stores one or more IDs and may be provided in different locations. For example, referring to FIGS. 3-4, the routers 140 may each store a department ID 241 indicating the department in which the router 140 is associated with and/or a building ID 242 indicating the building 150 that the router 140 is associated with. The wearable devices 1 may be configured to output any amount of information obtained by the wearable devices 1 (e.g. sensor data, switch data, user ID 230, equipment ID 220, vehicle ID 210, event or health data of the user, notification of functions performed by the wearable device) to one or more of the routers 140 that are in range. A router 140 that is in range with one of the wearable devices 1 may output the data received from the one of the wearable devices 1 and output the one or more IDs stored in the router 140 (e.g. the department ID 241 and the building ID associated with the router 140) to a monitoring system 160 of the system 100. For example, the router 140 may output the one or more IDs via a network (e.g. the internet) to the monitoring system 160. In an embodiment, the equipment 120 and vehicles 110 may be configured to communicate (wired or wirelessly) with one or more of the routers 140 via the communication interfaces of the equipment 120 and vehicles 110. Alternatively or additionally to the wearable devices 1 outputting information to the routers 140, the vehicles 110 and equipment 120 may output any amount of information obtained by the vehicles 110 and equipment 120 to one or more of the routers 140. In an embodiment, the vehicles 110 and equipment 120 may be configured to separately communicate with the monitoring system 160. In embodiments, the wearable devices 1 may be configured to communicate with the routers 140 via the equipment 120 or vehicles 110.

The monitoring system 160 may comprise at least one processor and memory storing computer instructions configured to cause the at least one processor to perform the functions of the monitoring system 160. In an embodiment, the monitoring system 160 may be implemented as a cloud computing system. The monitoring system 160 may also comprise a communication interface that is configured to communicate with the one or more routers 140 of the system 100. For example, the communication interface of the monitoring system 160 may be configured to communicate with one or more of the routers 140 via the internet. The monitoring system 160 may be configured to monitor the status and safety of the users of the wearable devices 1 based on the information received from the routers 140, including the information from the wearable devices 1 and the information from the equipment 120 and vehicles 110.

For example, by receiving a wearable device ID 201 and a user ID 230 of the user using the wearable device 1, the monitoring system 160 may determine who is using the specific wearable device 1 and use the information obtained from the specific wearable device 1 to generate and/or update a profile 260a (refer to FIG. 4) of the user that is stored in the memory of the monitoring system 160. The monitoring system 160 may determine the status and safety of the user based on information obtained from sensors of the wearable device 1 and, in some cases, based on comparing such information to baseline data in the profile 260a of the user. Based on the status and safety of the user determined, the monitoring system 160 may send information (e.g. control commands) to the wearable device 1 associated with the user via one or more of the routers 140. Accordingly, the monitoring system may trigger certain functions (e.g. watch dogs, alarms, etc.) of the wearable devices 1. In an embodiment, the monitoring system 160 may store settings in each user profile 260a stored in memory of the monitoring system 160 and monitor the user of the wearable device 1 in accordance with the settings of the profile 260a of the user. In embodiments, the wearable device 1 may perform one or more functions of the monitoring system 160. In embodiments, the monitoring system 160 may send one or more of the profiles 260a to the wearable devices 1 to be stored in the wearable devices 1, and the wearable devices 1 may monitor its respective user in accordance with the profiles of the user that may include, for example, settings and health information (e.g. base line information of typical activity of the user). For example, the monitoring system 160 may send a particular profile 260a of a user to the wearable device 1 based on determining that the user is using the wearable device 1.

By receiving a wearable device ID 201 and an vehicle ID 210 or an equipment ID 220, the monitoring system 160 may determine, for example, that the user of the wearable device 1, that is associated with the wearable device ID 201, is using a particular vehicle 110 or equipment 120. The monitoring system 160 may store settings in the memory of the monitoring system 160 for each equipment 120 and vehicle 110 that has an associated ID, and monitor the user of the wearable device 1 in accordance with the settings of the particular vehicle 110 or equipment 120 that the user of the wearable device 1 is presently using. In an embodiment, the monitoring system 160 may store profiles 260b (refer to FIG. 4) for each equipment 120 and vehicle 110 that has an associated ID. Each of the profiles 260b may comprise the settings for the respect vehicle 110 or equipment 120 and/or a record of use history of the respective vehicle 110 or equipment 120. According to an embodiment, a subset of the vehicles 110 or equipment 120 may share a same set of settings based on, for example, each vehicle 110 or equipment 120 in the subset being a same type of vehicle or equipment. In embodiments, the wearable device 1 may perform one or more functions of the monitoring system 160. In embodiments, the monitoring system 160 may send one or more of the profiles 260b to the wearable devices 1 to be stored in the wearable devices 1, and the wearable devices 1 may monitor its respective user in accordance with the settings of the particular vehicle 110 or equipment 120 that the user is presently using. For example, the monitoring system 160 may send a particular profile 260b of a vehicle 110 or equipment 120 to the wearable device 1 based on obtaining that the user is using the vehicle 110 or equipment 120.

By receiving a wearable device ID 201 and the one or more IDs (e.g. department ID 241 and/or building ID 252) stored in a router 140, the monitoring system 160 may determine, for example, a particular area (e.g. building or room) and/or organization (company or department) in which the user of the wearable device 1, that is associated with the wearable device ID 201, is located. The monitoring system 160 may store settings in the memory of the monitoring system 160 for each location and/or organization that has an associated ID within, for example, a profile 260c (refer to FIG. 4), and monitor the user of the wearable device 1 in accordance with the settings of the particular location and/or organization in which the user of the wearable device 1 is present. In accordance with embodiments of the present disclosure, the system 100 may be configured to perform specific network area tracking based on, for example, the IDs of the building, rooms, or department received. In embodiments, the wearable device 1 may perform one or more functions of the monitoring system 160. In embodiments, the monitoring system 160 may send one or more of the profiles 260c to the wearable devices 1 to be stored in the wearable devices 1, and the wearable devices 1 may monitor its respective user in accordance with the settings of the particular location and/or organization in which the user is present. For example, the monitoring system 160 may send a particular profile 260c of a location and/or organization to the wearable device 1 based on determining that the user is within the location and/or organization.

The settings described above may include, for example, the contents of response protocols and processes, including when certain watch dogs are triggered and what functions occur during each watch dog.

According to an embodiment, the monitoring system 160 may be configured to obtain a specific location of a wearable device 1, and its associated user, by receiving GPS information obtained by the wearable device 1 and, for more specific location solutions, obtaining location information of the wearable device 1 from beacons and triangulation systems of the system 100. Accordingly, the monitoring system 160 may be configured to pinpoint the location of a user of a wearable device 1 in case of an emergency. In embodiments, the wearable device 1 may perform one or more functions of the monitoring system 160, including obtaining the location information. In embodiments, the wearable device 1 may send the location information to the monitoring system 160 (e.g. via one or more routers 140).

Based on the information obtained by the monitoring system 160 from one or more of the wearable devices 1, vehicles 110, equipment 120, devices 130, and routers 140, the monitoring system 160 may monitor the status and safety of the users of the wearable devices 1. According to embodiments, the monitoring system 160 may store the obtained information in its memory, and the at least one processor of the monitoring system 160 may control a display of the monitoring system 160 to display information of a particular wearable device 1 and its user. For example, with reference to FIG. 5, the at least one processor of the monitoring system 160 may control the display 165 of the monitoring system 160 to display, with respect to a particular wearable device 1, (a) a name of the building in which the user is located, based on the building ID 242 received, (b) the name of the user of the particular wearable device 1, based on the user ID 230 received, (c) a current shift of the user, (d) a current status of the user, the wearable device 1, equipment 120, or vehicle 110, (e) a name of the equipment 120 (or vehicle 110) being used by the user, based on the equipment ID 220 (or the vehicle ID 210) received; (f) health of the user based on information received about the user from the wearable device 1, (g) alarm information (e.g. whether any alarms were triggered concerning the user) based on information received from one or more of the wearable device 1, the vehicle 110, and the equipment 120, and (f) department location of the user, based on the department ID 241 obtained.

FIGS. 6A-D illustrate a flow diagram of a method of the system 100 according to an embodiment. The method includes a monitoring period and feedback watchdog.

Figure 7:
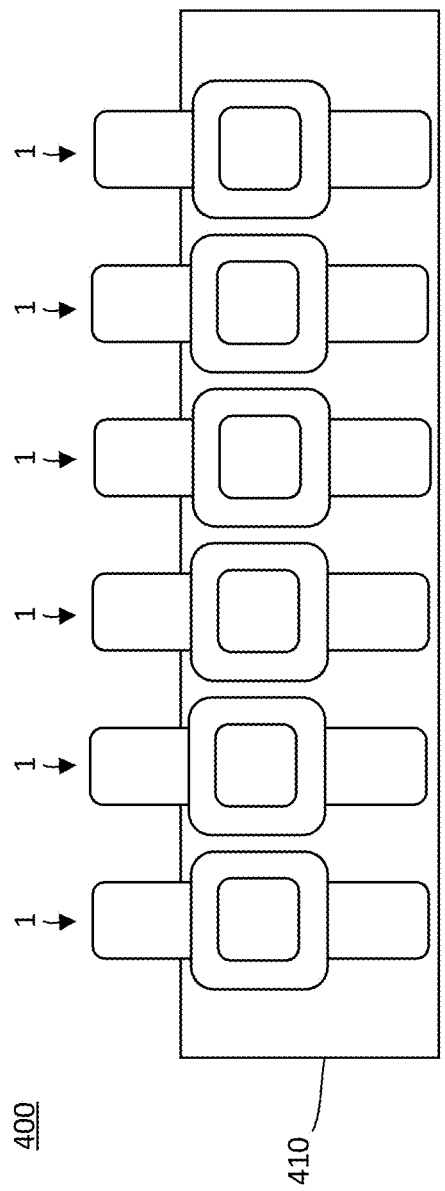
FIG. 7 is a front view of a wireless charger and a plurality of wearable devices according to an embodiment.
Figure 8:
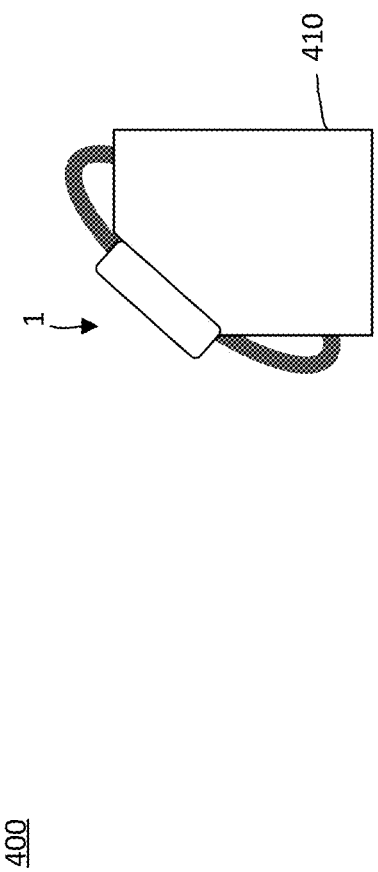
FIG. 8 is a side view of the wireless charger and the plurality of wearable devices.

For example, the wearable device 1 may be removed from a charger (306). An example of the charger is illustrated in FIGS. 7-8. The charger may be, for example, a wireless charger 400 (e.g. inductive charger). The charger may be configured as a charging bank 410 that charges a plurality of the wearable devices 1. The charger may be configured for wireless and/or wired charging. When the charger provides wireless charging, the charger may comprise a waterproof enclosure and provide ease of charging. After the wearable device 1 is taken off the charger, the wearable device 1 (and/or the monitoring system 160 by obtaining information from the wearable device 1), may monitor (308), for example, pO2 (partial pressure of oxygen), temperature, and movement patterns sensed by the wearable device 1 to determine whether the wearable device 1 is placed on a person (310). Based on the wearable device 1 (and/or the monitoring system 160) detecting that it is placed on a person, the wearable device 1 may perform a variety of features (312). For example, the wearable device 1 may be configured to receive the user ID 230 of the user such that the wearable device 1 and/or the monitoring system 160 may determine the current user of the wearable device 1 based on receiving the user ID 230. Alternatively or additionally, the wearable device 1 may output an inquiry via the speaker, lights, haptics, and/or display 58 of the wearable device 1 as to whether monitoring should be started. Alternatively or additionally, the wearable device 1 may output an alarm via the speaker, lights, haptics, and/or display 58 when a shift is to start. For example, the memory of the wearable device 1 and/or the monitoring system 160 may store shift information of the user and the alarm may be outputted by the wearable device 1 at a predetermined time, corresponding to a beginning of a shift, based on control of the controller 52 of the wearable device 1 and/or the monitoring system 160. In an embodiment, the wearable device 1 may be configured to receive the user ID 230 of the user such that the wearable device 1 and/or the monitoring system 160 may determine the current user of the wearable device 1 based on receiving the user ID 230, before the wearable device is placed on the user (e.g. while on the charger or after being taken off the charger).

The wearable device 1 (and/or the monitoring system 160) may start monitoring the user based on a hard start or a soft start (314). For example, a hard start of monitoring may be performed by the wearable device 1 (and/or the monitoring system 160) based on the user providing a user input to the wearable device 1 (e.g. touch, voice, or a specific input movement) to indicate monitoring is to be started. A soft start of monitoring may be provided when the user does not provide such user input. For example, the wearable device 1 (and/or the monitoring system 160) may automatically start monitoring based on a specific time (e.g. time after the wearable device 1 is placed on the wrist, or time corresponding to a shift start time) and/or based on detected movements of the user (e.g. movements indicating the user is working).

Figure 6A:
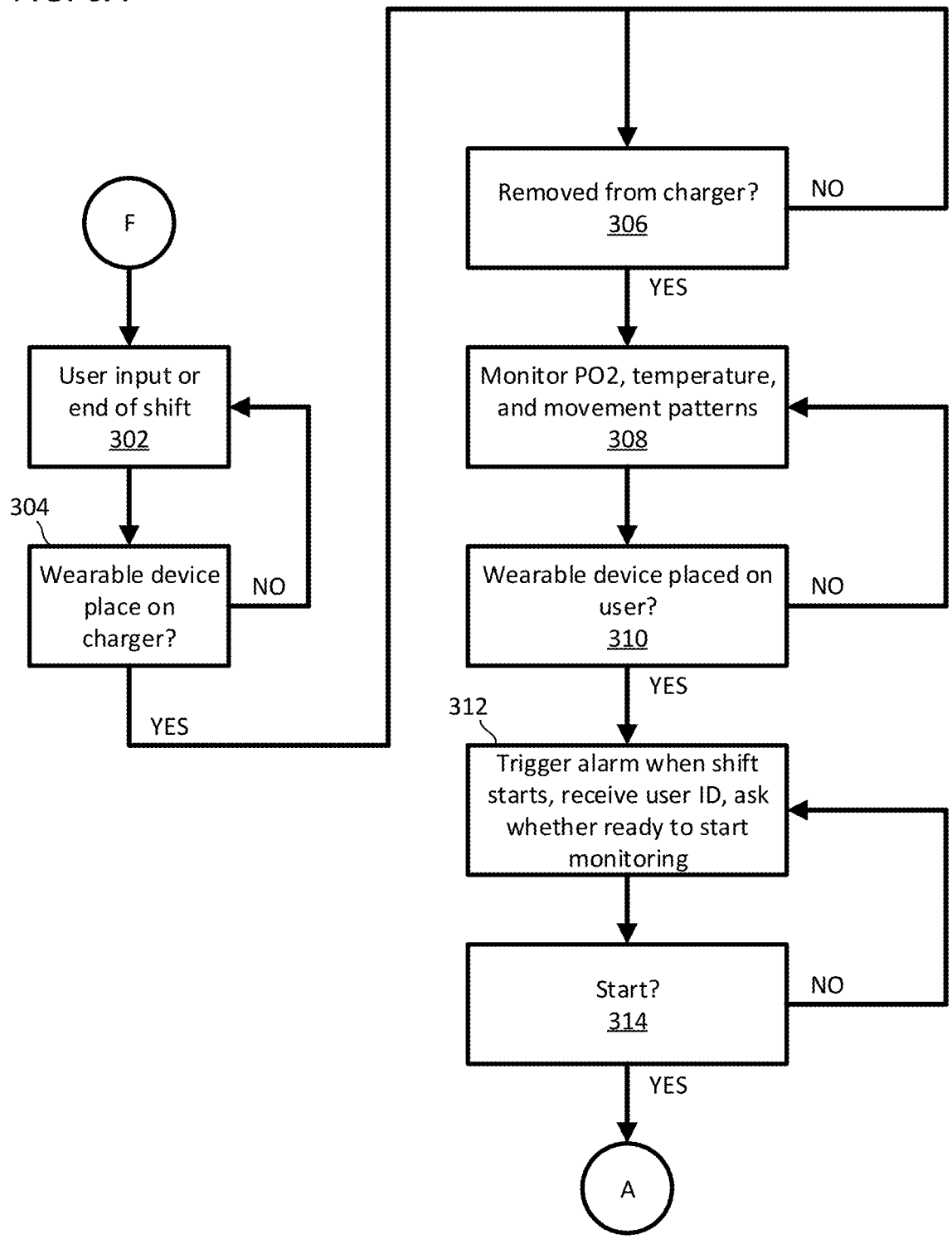
FIG. 6A illustrates a first part of a flow diagram of a method of the system according to an embodiment.
Figure 6B:
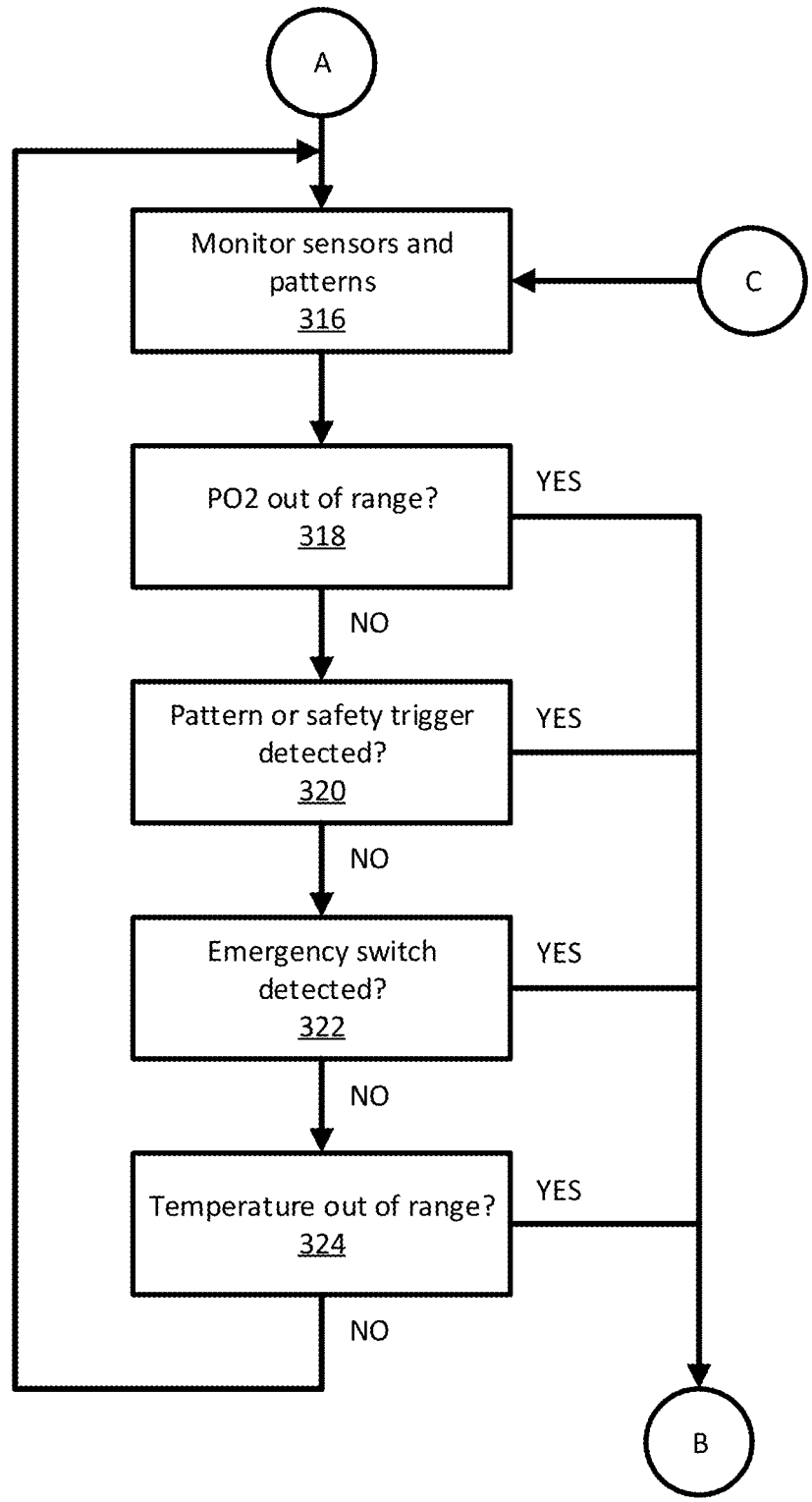
FIG. 6B illustrates a second part of the flow diagram of the method of the system, according to the embodiment.

Referring to FIG. 6B, after the soft start or hard start, the controller 52 of the wearable device 1 may receive inputs from one or more of the sensors and switches of the wearable device 1, and the controller 52 (and/or the monitoring system 160 by receiving such inputs directly or indirectly from the wearable device 1) may determine whether there is possible harm to the user based on, the received information (316). For example, if the controller 52 of the wearable device 1 (and/or the monitoring system 160) determines that pO2 (318), temperature (324), or sound sensed by the wearable device is outside a predetermined range (e.g. is within an abnormal range) or indicates an abnormal activity pattern, detects particular movement patterns (e.g. by using an accelerometer 11 to detect an abnormal activity pattern such as one that indicates a fall, a crash, or injury) (320), or detects operation of an emergency button or switch of the wearable device 1 (322), the controller 52 of the wearable device 1 may control one or more of the speakers, lights, haptics, and/or display 58 to output a request for the user to verify his or her disposition (326) (refer to FIG. 6C). Accordingly, the controller 52 of the wearable device 1 (and/or the monitoring system 160) may function to provide a watch dog (e.g. a first watch dog). For example, the speaker of the wearable device 1 may output a tone and/or the display 58 of the wearable device 1 may display the request with text. In an embodiment, one or more of the wearable device 1 and the monitoring system 160 may receive status information of and from a vehicle 110 or equipment 120 used by the user of the wearable device 1 to determine whether the possible issue regarding the user exists based on, alternatively or additionally, such status information. The status information may include, for example, sensing of a crash of a user operated vehicle 110 by a sensor of the vehicle 110, or an indication that an emergency stop of user operated equipment 120 was triggered, or any other indication sensed by a sensor of the user operated vehicle 110 or equipment 120 that the vehicle 110 or equipment 120 operated irregularly. In an embodiment, the wearable device 1 (and/or the monitoring system 160) may use a sensor to detect shallow breathing which may indicate a possible harm to the user. In an embodiment, the wearable device 1 (and/or the monitoring system 160) may provide a warning time before outputting an alarm (e.g. a person alarm or a global alarm).

The controller 52 of the wearable device 1 (and/or the monitoring system 160) may wait to obtain indication of the disposition of the user (e.g. needs help or does not need help) based on a user input from the user (e.g. touch, voice, or a specific input movement) to the wearable device 1. For example, the controller 52 of the wearable device 1 (and/or the monitoring system 160) may determine that certain user inputs (e.g. tapping the display multiple times, saying "help", pressing a specific button, or moving in a particular movement pattern) indicate the user needs help and certain other user inputs (e.g. tapping the display once, saying "okay", pressing a specific button, or moving in a particular movement pattern) indicate the user does not need help.

Figure 6C:
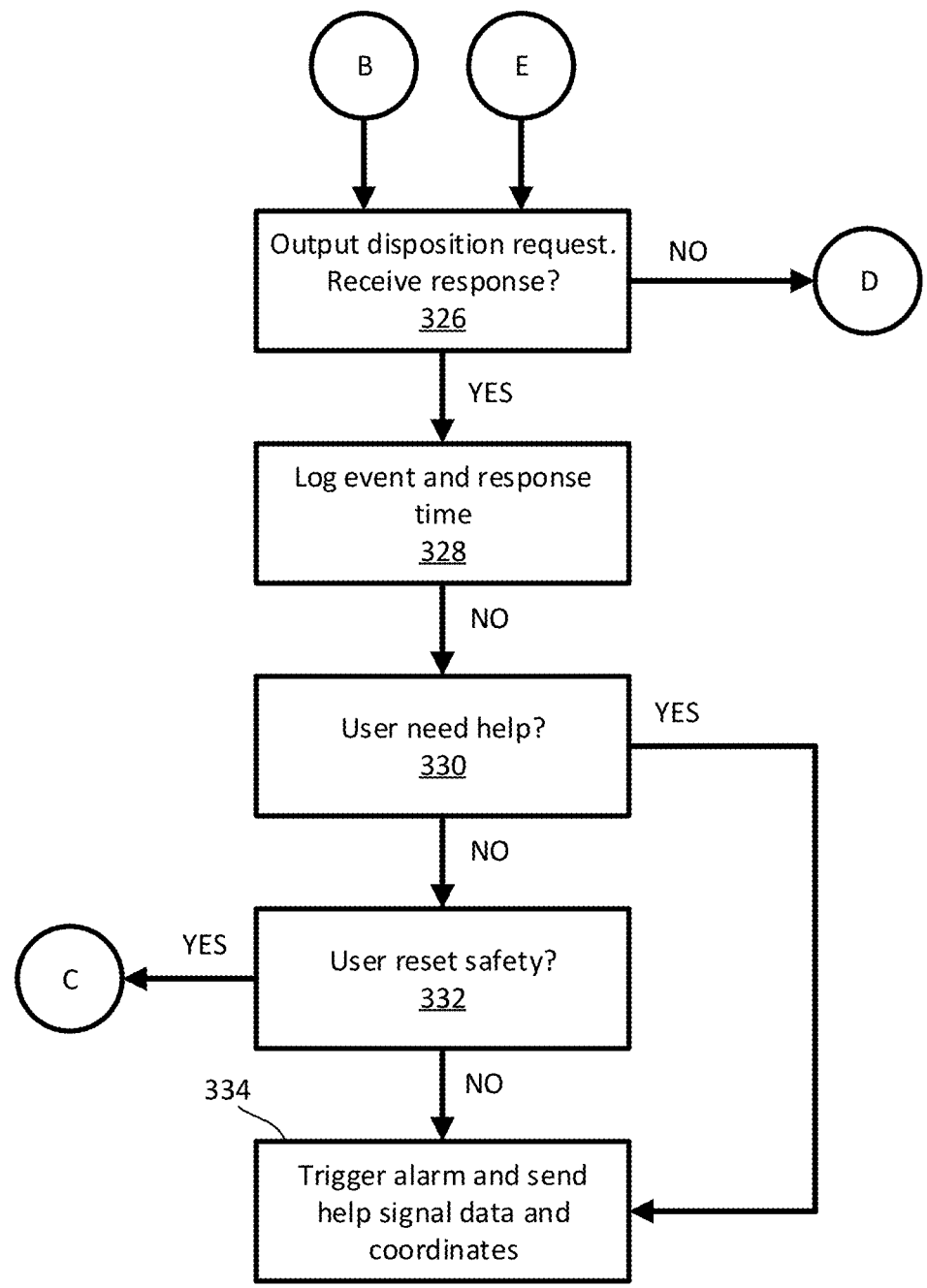
FIG. 6C illustrates a third part of the flow diagram of the method of the system, according to the embodiment.
Figure 6D:
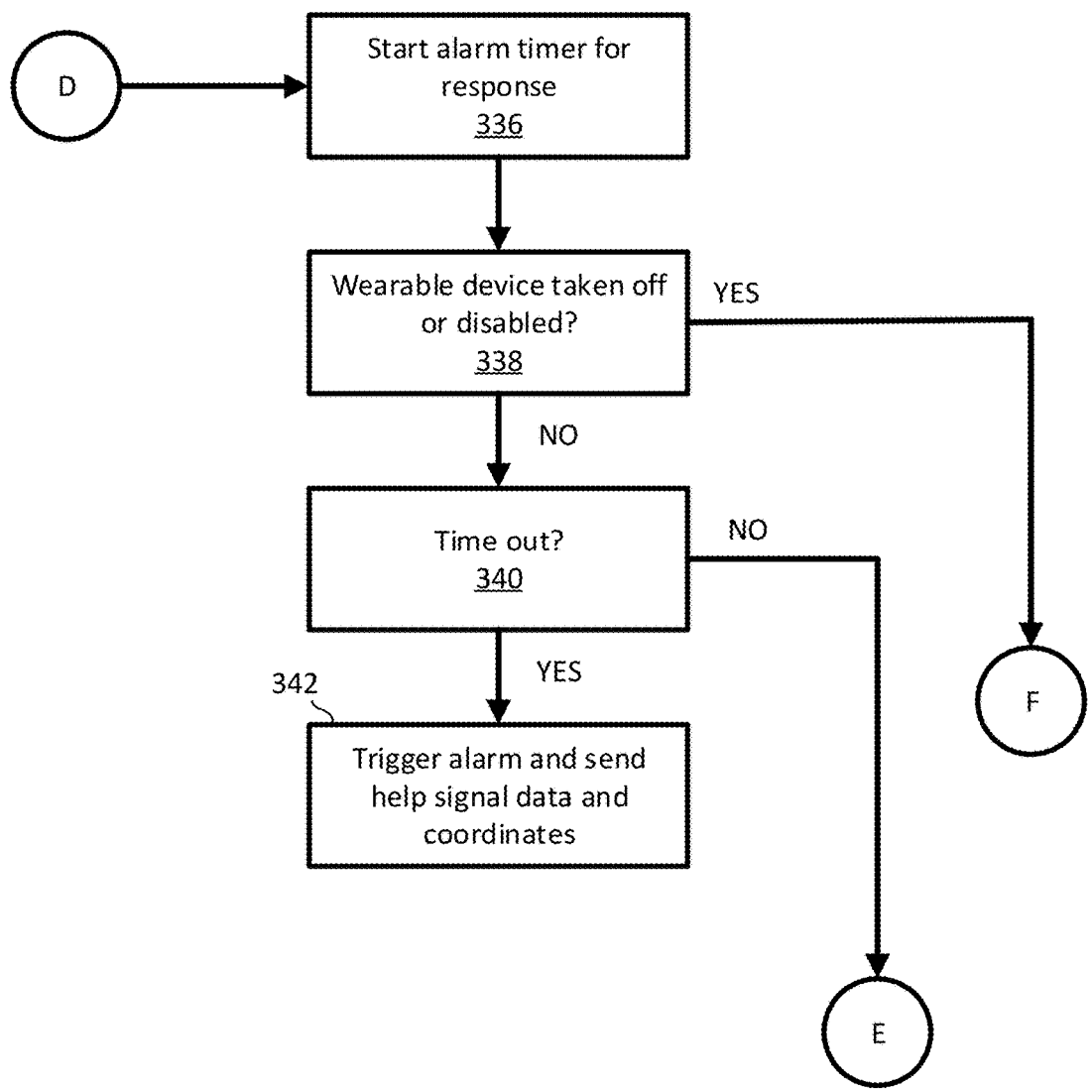
FIG. 6D illustrates a fourth part of the flow diagram of the method of the system, according to the embodiment.

Referring to FIG. 6D, in a case where the user does not provide a user input that indicates his or her disposition, the wearable device 1 (and/or the monitoring system 160) may start (336) an alarm timer for a response from the user and, when the alarm timer is running, the wearable device 1 (and/or the monitoring system 160) may check whether the wearable device 1 is removed (based on sensor readings from the sensors of the wearable device 1) or disabled (338), and may check whether the alarm timer is timed out (340). Referring to FIGS. 6C-D, when the alarm timer is not timed out, the wearable device 1 (and/or the monitoring system 160) may continue wait to obtain indication of the disposition of the user from one or more sensors, switches, or buttons of the wearable device 1 (326).

Referring to FIGS. 6A and 6D, when the wearable device 1 is removed from the user or disabled, the wearable device 1 (and/or the monitoring system 160) may automatically determine that an end of shift of the user has occurred and/or determine that the end of the shift occurred based on an input of the user to the wearable device 1 (302). The wearable device 1 (and/or the monitoring system 160) may then determine whether the wearable device 1 is placed on the charger (304).

Referring back to FIG. 6D, when the alarm time is timed out without indication of the disposition of the user being obtained, one or more of the wearable device 1 and the monitoring system 160 may cause an alarm and output help signal data and position information of the user (342). For example, the controller 52 of the wearable device 1 may cause the speaker of the wearable device 1 to output an alarm, and the communication system 60 of the wearable device 1 to output help signal data (e.g. indicating an emergency) and location information of the wearable device 1 to the monitoring system 160 and/or a third party emergency system (e.g. 911 dispatch system). Accordingly, the controller 52 of the wearable device (and/or the monitoring system 160) may function to provide further watch dogs (e.g. a second watch dog and/or a third watch dog).

Referring back to FIG. 6C, in a case where the user does provide the user input that indicates his or hers disposition, the wearable device 1 (and/or the monitoring system 160) may log information of the event (e.g. sensor reading that triggered the need to verify user disposition, time and date of triggering, location of wearable device 1, user name, etc.) and a response time of the user to provide the indication of user disposition (328). When the user input indicates that the user needs help (330), one or more of the wearable device 1 and the monitoring system 160 may cause an alarm and output help signal data and position information of the user (334). For example, the controller 52 of the wearable device 1 may cause the speaker of the wearable device 1 to output an alarm, and the communication system 60 of the wearable device 1 to output help signal data (e.g. indicating an emergency) and location information of the wearable device 1 to the monitoring system 160 and/or a third party emergency system (e.g. 911 dispatch system). Referring to FIGS. 6B-C, when the user input indicates that the user does not need help, the controller 52 of the wearable device 1 (and/or the monitoring system 160) may reset (332) by again determining whether there is a possible issue regarding the user by monitoring inputs from one or more of the sensors and switches of the wearable device 1 (316). Such a reset may be referred to as a disposition reset, and may be triggered by a pre-defined input by the user on the wearable device 1 (332).

Figure 9:
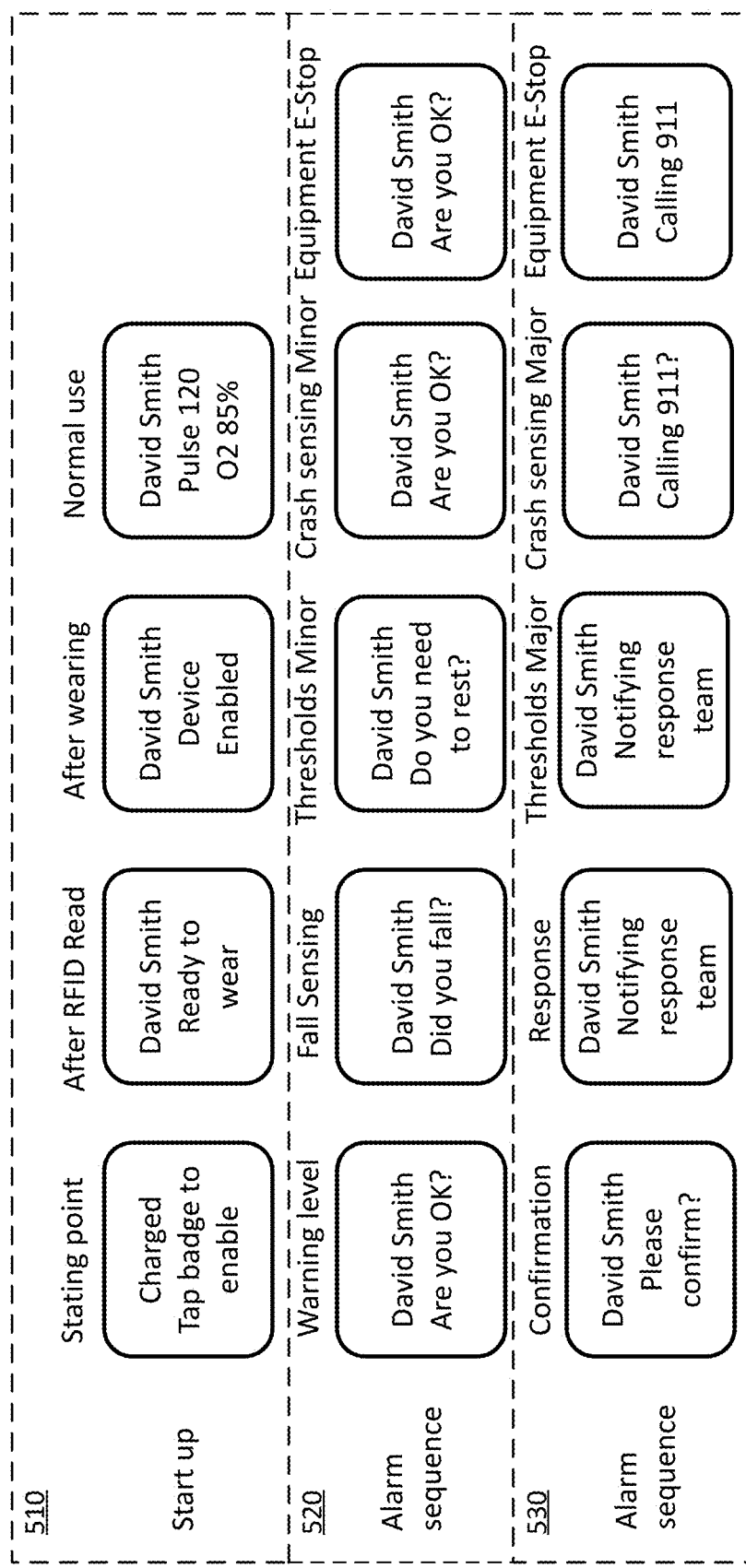
FIG. 9 illustrates a diagram of user interface sequences according to an embodiment.

FIG. 9 illustrates example user interface sequences that the controller 52 of the wearable device 1 may cause the display 58 of the wearable device 1 to display.

The top row of FIG. 9 illustrates user interface sequences during an example start up process 510 in which the wearable device 1 is configured and initialized. After the wearable device 1 is taken off a charger, and/or while the wearable device 1 is on the charger, the display 58 may display a charge state of the wearable device 1 as an indication that a user should tap their device 130 (e.g. badge) to the wearable device 1 to prepare the wearable device 1 for use. After the wearable device 1 (and/or the monitoring system 160) determines the identity of the user based the user tapping their device 130 on the wearable device 1 and the RFID reader of the wearable device obtaining the ID of the user, the display 58 may display the name of the user and indicate that the wearable device 1 is ready to wear. After the wearable device 1 (and/or the monitoring system 160) determines that the user is wearing the wearable device 1 based on sensors of the wearable device 1, the display 58 may indicate that the wearable device 1 is enabled. While the wearable device 1 (and/or the monitoring system 160) is monitoring the user during normal use, the display 58 may display information sensed by the sensors of the wearable device 1 from the user (e.g. pulse, oxygen levels).

The middle row and bottom rows of FIG. 9 illustrate user interface sequences during example alarm sequences 520, 530. Based on a type and severity of an event detected by the wearable device 1 (and/or the monitoring system 160), the display 58 of the wearable device 1 may be controlled in different ways, and the wearable device 1 (and/or the monitoring system 160) may soft or hard trigger certain functions (e.g. may wait for confirmation of disposition of the user, or may immediately request an emergency response).

For example, with reference to the middle row, if the controller 52 of the wearable device 1 (and/or the monitoring system 160) obtains data from the sensors of the wearable device 1 and/or sensors of an operated vehicle 110 or equipment 120 that is (1) at a predetermined level (e.g. a warning level), (2) indicates a fall of the user, (3) passes a minor predetermined threshold, (4) indicates a minor crash of a vehicle, or (5) indicates that an emergency stop of equipment 120 occurred, the display 58 may be controlled to display a request for the user to indicate his or her disposition, and the wearable device 1 (and/or the monitoring system 160) may wait to receive a user input by the user that indicates his or her disposition.

With reference to the bottom row, the display 58 may display a request for confirmation by the user that he or she is okay and, in response to the user inputting to the wearable device 1 a response indicating that he or she is not okay, the display 58 may display an indication that a response team is being notified and the wearable device 1 (and/or the monitoring system 160) may notify the response team of the incident. For example, the wearable device 1 may output help signal data (e.g. indicating an emergency) and location information of the wearable device 1 to the monitoring system 160 and/or a third party emergency system (e.g. 911 dispatch system). In cases where the controller 52 of the wearable device 1 (and/or the monitoring system 160) obtains data from the sensors of the wearable device 1 and/or sensors of an operated vehicle 110 or equipment 120 that is (1) passes a major predetermined threshold (e.g. a second threshold), (2) indicates a major crash of a vehicle 110, or (3) indicates that an emergency stop of equipment 120 occurred, the display 58 may also display an indication that a response team is being notified and the wearable device 1 (and/or the monitoring system) may notify the response team of the incident.

FIG. 10 illustrates a representative timing diagram for an event trigger 610, a confirmation request 620, and a confirmation 630, of embodiments of the present disclosure. Once an event 612 (e.g. possible harm to the user) is detected by the wearable device 1 (and/or the monitoring system 160), the wearable device 1 may output a request 622 to the user to confirm whether he or she is okay. The user may have a specific amount of time to confirm they are okay during the request 622. If the user indicates that he or she is okay within the specific amount of time (refer to reference character 634), then no emergency event may be triggered by the wearable device 1 (and/or the monitoring system 160). If the user does not indicate that he or she is okay within the specific amount of time (and/or indicates that he or she is not okay), the wearable device 1 (and/or the monitoring system 160) may determine that an emergency event has occurred and may respond accordingly. For example, at a time corresponding to reference character 644 in FIG. 10, the wearable device 1 may determine that an emergency event has occurred. Also, at the time corresponding to reference character 644 or after a predetermined amount of time following (e.g. at a time corresponding to reference character 646), the wearable device 1 may output help signal data (e.g. indicating an emergency) and location information of the wearable device 1 to the monitoring system 160 and/or a third party emergency system (e.g. 911 dispatch system), and/or the monitoring system 160 may output help signal data (e.g. indicating an emergency) and location information of the wearable device 1 to the third party emergency system (e.g. 911 dispatch system). Reference character 646 may also correspond to a time in which the wearable device 1 (and/or the monitoring system 160) receives a response from a responder (e.g. personnel of the third party emergency system) concerning response time to the event. According to embodiments, the inclusion of the specific amount of time before automatically determining an emergency event has occurred may prevent false determinations of emergency events. According to embodiments, depending on the type of event (e.g. fall, vehicle crash, emergency stop of equipment) and/or possible severity (e.g. sensor reading passes a minor threshold versus a major threshold, or sensor reading is closer to or further from a base line value) of the event, the specific amount of time before automatically determining an emergency event has occurred may be set by the wearable device 1 (and/or the monitoring system 160) to be faster or slower.

FIGS. 11A-C illustrate example sequences of the system 100, according to embodiments. FIG. 11A indicates an example voice request 701 from the wearable device 1 to a user 2 to confirm whether the user 2 is okay, and a response 702 from the user 2 to the wearable device 1 that the user 2 is not okay. FIG. 11B illustrates example alarms 703, 704, 705 outputted by the speaker, haptics, and lights of the wearable device 1 based on the wearable device 1 (and/or the monitoring system 160) determining that a user of the wearable device 1 needs help based on receiving a user input from the user or timing out of a time for a response by the user. FIG. 11C indicates that the speaker and haptics of the wearable device may be controlled by the wearable device (and/or the monitoring system) to output a warning tone and vibration 706 based on detection of an anomaly of an output of a sensor of, for example, the wearable device 1. According to embodiments, the wearable device 1 may be configured to output light and tones to indicate the wearable device 1 is functioning properly.

According to embodiments, the wearable device 1 (and/or the monitoring system 160) may be configured to control a vehicle 110 or equipment 120, in which the user intends to use, to be able to be operated (e.g. to turn on the vehicle 110 or equipment 120 or otherwise make the vehicle 110 or equipment 120 operable) or unable to be operated (e.g. locked out) based on determining whether the user is qualified to operate the vehicle 110 or equipment 120. For example, the wearable device 1 (and/or the monitoring system 160) may analyze sensor inputs of the sensor & switch system 10 of the wearable device 1 to determine whether the user is in sufficient health to operate the vehicle 110 or equipment 120 and/or may determine whether the profile of the user includes an appropriate safety rating or performance that indicates the user is qualified to use the vehicle 110 or equipment 120. In an embodiment, while a user of a wearable device 1 is operating one or more vehicles 110 or equipment 120, the wearable device 1 (and/or the monitoring system 160) may be configured to receive sensor inputs (e.g. inputs from the sensor & switch system 10 of the wearable device 1, and/or the vehicle 110 or equipment 120, and/or other sensors such as cameras external to the vehicle 110 or equipment 120) and track performance and rate of the user for each vehicle 110 and equipment 120 used. In an embodiment, the wearable device 1 (and/or the monitoring system 160) may store a record of the performance and rate of the user in the profile of the user, and may determine one or more safety ratings of the user based on the performance and rate tracked. The one or more safety ratings may be stored in the profile of the user. In an embodiment, the wearable device 1 (and/or the monitoring system 160) may be configured to cause a vehicle 110 or equipment 120 to lock out (e.g. power lock out) after a safety trip of the vehicle 110 or equipment 120 is detected indirectly or directly by the wearable device 1 (and/or the monitoring system 160). Following the safety trip, a supervisor may have to reset the vehicle 110 or the equipment 120 for operation.

According to embodiments, the sensor & switch system 10 of the wearable device 1 may include one or more sensors configured to detect characteristics of a user over time including, for example, pulse, oxygen, heart rate, activity, movement, and temperature, and the wearable device 1 (and/or the monitoring system 160) may be configured to track and record the detected characteristics and determine whether the user may possibly be suffering from an illness (e.g. COVID-19) or has symptoms (e.g. respiratory symptoms) of an illness.

According to embodiments, the wearable device 1 (and/or the monitoring system 160) may be configured to track performance of a user for each vehicle 110 and equipment 120 the user operates based on received sensor inputs (e.g. inputs from the sensor & switch system 10 of the wearable device 1, and/or the vehicle 110 or equipment 120, and/or other sensors such as cameras external to the vehicle 110 or equipment 120) and track activity (e.g. personal movement and other characteristics, including health characteristics such as energy levels, heart rate, pulse, oxygen, temperature) of the user. The wearable device 1 (and/or the monitoring system 160) may be configured to store and display statistics on performance of operating a vehicle 110 (and/or equipment 120) versus the activity of the user, including statistics indicating the performance of the user operating the vehicle 110 (and/or equipment 120) at difference activity levels (e.g. low, average, and high) of the user.

According to embodiments, the wearable device 1 (and/or the monitoring system 160) may be configured to determine whether a user of the wearable device 1 is having a "good" day or a "bad" day based on obtained information from the user, including energy levels, movement, heart rate, pulse, oxygen, etc. Based on the wearable device 1 (and/or the monitoring system 160) determining that the user of the wearable device 1 is operating at a predetermined level below a typical performance level (e.g. energy level, movement level, heart rate level, pulse level, oxygen level, or any combination thereof) of the user (and/or a plurality of users) or that the performance of the user slows at a predetermined rate and/or to a predetermined level, the wearable device 1 (and/or the monitoring system 160) may enter into an evaluation mode. For example, the evaluation mode may be a mode in which determining whether there is possible harm to the user is started, or a mode in which more sensors is used and/or further evaluation is conducted to determine whether there is a possible harm to the user.

According to embodiments, the equipment 120 and vehicles 110 may comprise interfaces (e.g. displays) that are configured to be controlled by at least one processor therein, and/or by the wearable device 1 (and/or the monitoring system 160), to display information of the health of the user obtained by the wearable device 1 (and/or the monitoring system 160), safety information, and the status of safety interlocks of the equipment 120 or vehicle 110.

According to embodiments, the system 100 may further comprise illness testing devices (e.g. pathogen or antibody testing devices such as a spectral metrology device) that may test individuals for illnesses. The wearable device 1 (and/or the monitoring system 160) may be configured to communicate indirectly or directly with the illness testing devices and store test result information of an individual, obtained from the illness testing devices, in the profile of the individual. In an embodiment, one or more of the illness testing devices, the wearable device 1, and the monitoring system 160, may be configured to determine the test results are of a particular individual by, for example, obtaining or matching the ID of the individual with the test results. The ID of the individual may be obtained from a badge of the individual by, for example, an RFID reader of the wearable device or the testing devices. In an embodiment, the wearable device 1 (and/or the monitoring system 160) may be configured to track test result history of the individual and activity history of the individual (e.g. energy history, movement history, heart rate history, pulse history, oxygen history, temperature history or any combination thereof) of the individual, and compare the test result history and the activity history of the individual to characterize illness patterns of the individual. By characterizing illness patterns of the individual, the wearable device 1 (and/or the monitoring system 160) may be configured to determine whether the individual is presently ill based on analyzing present sensor inputs (and patterns thereof) of the wearable device 1, worn by the individual, in context of the illness patterns of the individual obtained from the test result history and the activity history.

According to embodiments, a wearable safety monitoring device (e.g. wearable device 1) may be provided. The wearable safety monitoring device may include a housing; a communication interface that is configured to receive identification of a user of the wearable safety monitoring device, and is configured to receive safety data from equipment or vehicles; at least one sensor shielded from light within the housing, the at least one sensor configured to measure pulse and oxygen of the user; and an LED light source surrounded by a breathable foam; and a controller (e.g. controller 52) comprising at least one processor. The controller may be configured to: determine whether there is a possible harm to the user of the wearable safety monitoring device based on at least one input from the at least one sensor; based on determining that there is the possible harm, performing a watch dog loop, including listening for a confirmation from the user of harm to the user; output an alarm based on receiving the confirmation of harm to the user or based on not receiving any confirmation from the user within a predetermined amount of time; and obtain a location of the wearable safety monitoring device based on an input from a sensor of the least one sensor or from at least one external sensor. The communication interface may include an RFID reader or a phone interface configured to receive the identification of the user.

Figure 12:
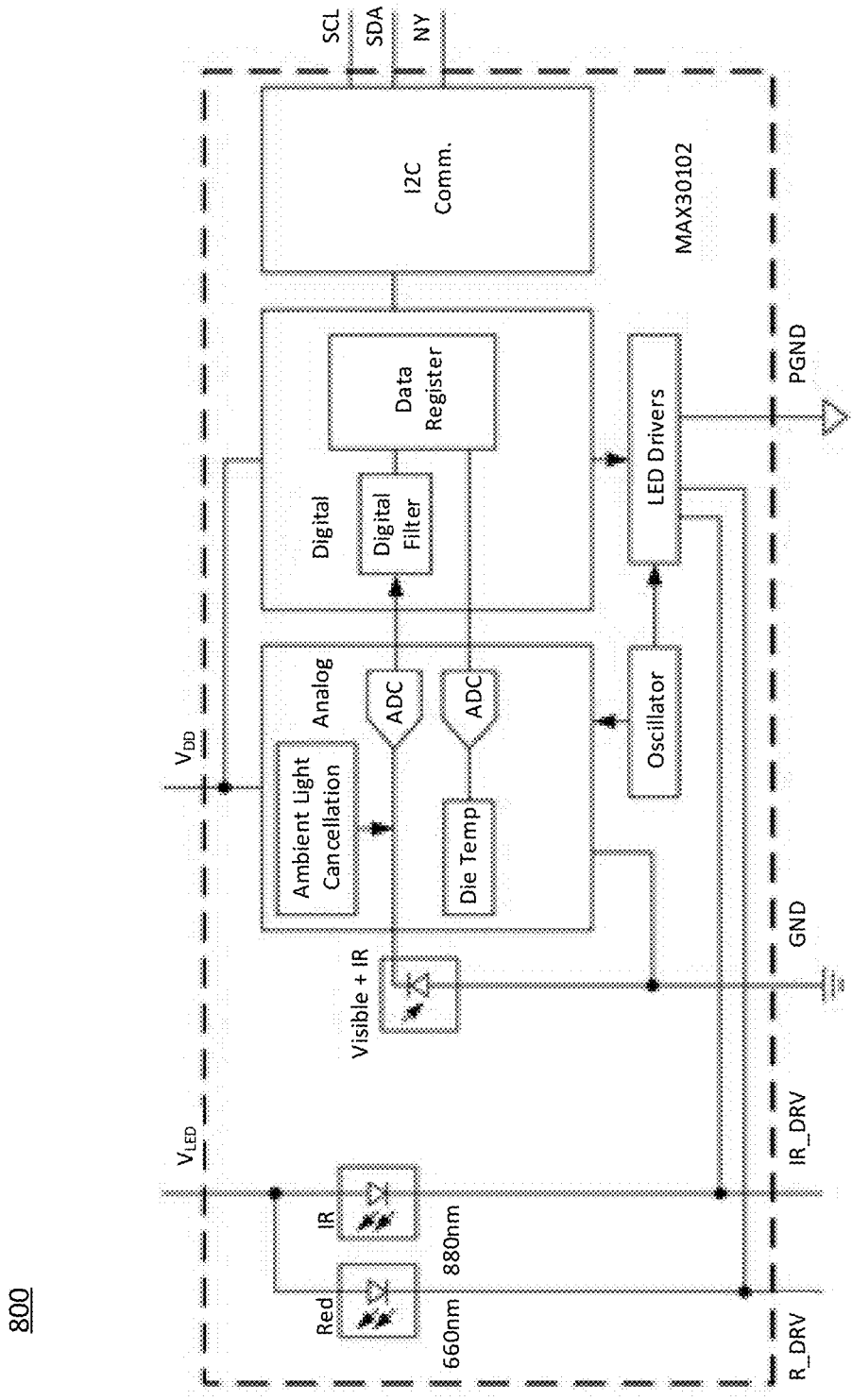
FIG. 12 illustrates an example of a pulse oxygen sensor module according to an embodiment.
Figure 13:
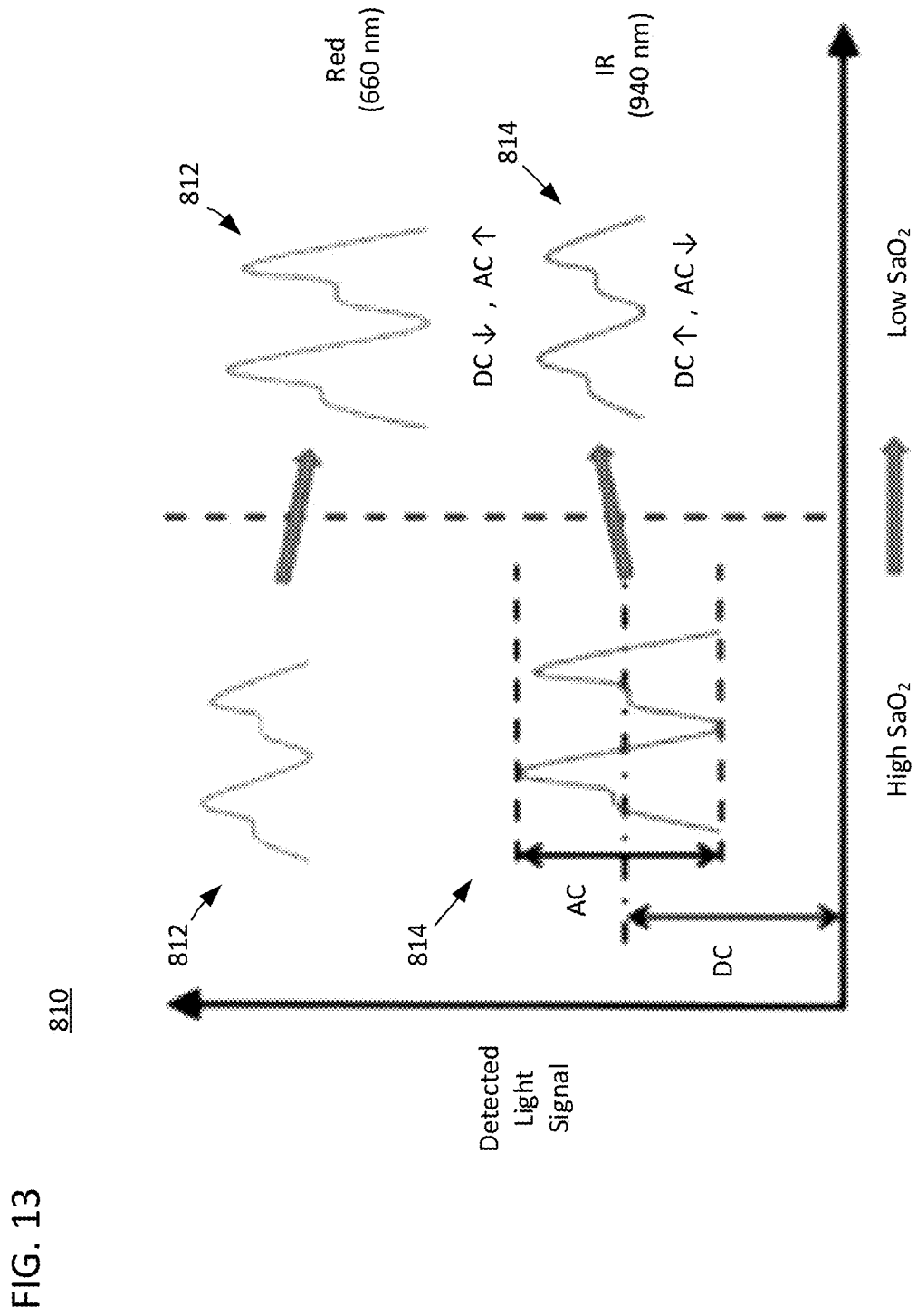
FIG. 13 illustrates a diagram for explaining detection of oxygen levels, according to an embodiment of the present disclosure.

According to embodiments, the sensor & switch system 10 may include a pulse oxygen sensor 800 as shown in FIG. 12 that senses light to detect oxygen levels of a user. The controller 52 may be configured to detect oxygen levels of a user, and changes thereof, based on an output of the pulse oxygen sensor. For example, with reference to diagram 810 of FIG. 13, the controller 52 may be configured to determine SaO2 levels, and/or changes thereof, based on DC and AC components of a detected light signal of various frequencies. For example, for a red light 812 (660 nm), the controller 52 may determine an oxygen level decreases to a low level based on a DC component decreasing and an AC component increasing. Also, for infrared (IR) light 814 (940 nm), the controller 52 may determine an oxygen level decreases to a low level based on a DC component increasing and an AC component decreasing.

The above describes non-limiting example embodiments of the present disclosure. Various alterations and changes can be made without departing from the spirit and aspects of the present disclosure. The non-limiting example embodiments is presented for illustrative purposes and should not be interpreted as an exhaustive description of all embodiments of the present disclosure, or limit the scope of the claims to the specific elements illustrated or described in connection with these embodiments. For example, and without limitation, any individual element(s) of the described example embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the embodiments of the present disclosure include a plurality of features that are described in concert and that might cooperatively provide a collection of benefits. Embodiments of the present disclosure are not limited to only those embodiments that include all of these features or that provide all of the stated benefits. Any reference to claim elements in the singular, for example, using the articles "a," "an," "the" or "said," is not to be construed as limiting the element to the singular.

The invention claimed is:

1. A system comprising:
 a vehicle or equipment comprising a non-transitory computer readable medium including a first identifier of the vehicle or equipment;
 a wearable device comprising:
  at least one sensor configured to sense a characteristic of a user while the user wears the wearable device;
  a communication interface configured to obtain the first identifier from the vehicle or equipment; and
  a controller comprising at least one processor and memory, the controller configured to:
   monitor the user based on the first identifier or send the first identifier to a monitoring system via the communication interface,
   determine whether there is a harm possibly occurring to the user of the wearable device based on at least one output from the at least one sensor, or send the at least one output to the monitoring system, via the communication interface, to determine whether the harm is possibly occurring, and
   output, after the harm is determined to be possibly occurring, an alarm based on receiving confirmation from the user by the wearable device, or based on not receiving any confirmation from the user within a predetermined amount of time; and
 the monitoring system, the monitoring system comprising at least one processor and memory,
 wherein the controller is configured to send the first identifier to the monitoring system via the communication interface, the monitoring system stores settings associated with the vehicle or equipment, the monitoring system is configured to send, via a communication interface of the monitoring system, a profile of the settings associated with the vehicle or equipment to the wearable device based on receiving the first identifier from the wearable device, and the controller of the wearable device is configured to monitor the user based on the profile that is received.

2. The system of claim 1, wherein the monitoring system is configured to monitor the user of the wearable device based on the first identifier.

3. The system of claim 2, wherein the monitoring system is configured to determine that the user is operating or attempting to operate the vehicle or equipment based on receiving the first identifier.

4. The system of claim 3, wherein the monitoring system is configured to control the vehicle or equipment to enable or disable operability of the vehicle or equipment by the user, based on a determination using the at least one output from the at least one sensor of the wearable device.

5. The system of claim 2, further comprising:

a router comprising memory that stores a second identifier that indicates a location of the router or an organization corresponding to the location, wherein the router is configured to receive the first identifier from the wearable device, and send the first identifier and the second identifier to the monitoring system, and the monitoring system is configured to monitor the user of the wearable device based on the first identifier and the second identifier.

6. The system of claim 5, wherein the monitoring system is configured to determine that the user is at the location or within the organization based on receiving the second identifier.

7. The system of claim 2, further comprising:

a device comprising a non-transitory computer readable medium including a second identifier of the user, wherein the communication interface of the wearable device is further configured to obtain the second identifier from the device, the controller of the wearable device is configured to send the first identifier and the second identifier to the monitoring system via the communication interface, and the monitoring system is configured to monitor the user of the wearable device based on the first identifier and the second identifier.

8. The system of claim 5, wherein the monitoring system is configured to determine that the user is operating or attempting to operate the vehicle or equipment based on receiving the first identifier and the second identifier.

9. The system of claim 7, wherein the controller stores a third identifier of the wearable device, and the controller is configured to send the first identifier, the second identifier, and the third identifier to the monitoring system via the communication interface, and the monitoring system is configured to monitor the user of the wearable device based on the first identifier, the second identifier, and the third identifier.

10. The system of claim 2, wherein the controller stores a second identifier of the wearable device, and the controller is configured to send the first identifier and the second identifier to the monitoring system via the communication interface, and the monitoring system is configured to monitor the user of the wearable device based on the first identifier and the second identifier.

11. The system of claim 1, wherein the settings describe how the wearable device is to monitor the user.

12. A wearable device comprising:

at least one sensor configured to sense a characteristic of a user while the user wears the wearable device;

a communication interface configured to obtain a first identifier of a vehicle or equipment from the vehicle or equipment; and a controller comprising at least one processor and memory, the controller configured to:

monitor the user based on the first identifier or send the first identifier to a monitoring system via the communication interface, determine whether there is a harm possibly occurring to the user of the wearable device based on at least one output from the at least one sensor, or send the at least one output to the monitoring system, via the communication interface, to determine whether the harm is possibly occurring, and output, after the harm is determined to be possibly occurring, an alarm based on receiving confirmation from the user by the wearable device, or based on not receiving any confirmation from the user within a predetermined amount of time, wherein the controller of the wearable device is configured to send the first identifier to the monitoring system via the communication interface, the controller of the wearable device is configured to receive, from the monitoring system, a profile of settings associated with the vehicle or equipment based on sending the first identifier to the monitoring system, and the controller of the wearable device is further configured to monitor the user based on the profile that is received.

13. The wearable device of claim 12, wherein the communication interface of the wearable device is further configured to obtain a second identifier of the user from a device that includes a non-transitory computer readable medium that includes the second identifier, and the controller of the wearable device is configured to monitor the user based on the first identifier and the second identifier, or send the first identifier and the second identifier to the monitoring system via the communication interface.

14. The wearable device of claim 13, wherein the controller stores a third identifier of the wearable device, and the controller is configured to monitor the user based on the first identifier, the second identifier, and the third identifier, or send the first identifier, the second identifier, and the third identifier to the monitoring system via the communication interface.

15. The wearable device of claim 12, wherein the controller stores a second identifier of the wearable device, and the controller is configured to monitor the user based on the first identifier and the second identifier, or send the first identifier and the second identifier to the monitoring system via the communication interface.

16. The wearable device of claim 12, wherein the communication interface comprises a radio-frequency identification (RFID) reader configured to obtain the first identifier from the vehicle or equipment.

17. The wearable device of claim 12, wherein the settings describe how the wearable device is to monitor the user.

18. A method performed by at least one processor, the method comprising:
- obtaining, by a wearable device, a first identifier of a vehicle or equipment from the vehicle or equipment;
- sending the first identifier to a monitoring system via a communication interface;
- receiving, from the monitoring system, a profile of settings associated with the vehicle or equipment based on sending the first identifier to the monitoring system; and
- monitoring a user of the wearable device based on profile of settings and at least one output from at least one sensor of the wearable device, the at least one sensor configured to sense a characteristic of the user while the user wears the wearable device, and the monitoring comprising:
  - determining whether there is a harm possibly occurring to the user of the wearable device based on the at least one output from the at least one sensor of the wearable device, and
  - causing, after the harm is determined to be possibly occurring, an alarm to be output by the wearable device based on the wearable device receiving confirmation from the user, or based on not receiving any confirmation from the user within a predetermined amount of time.

19. The method of claim 18, wherein the settings describe how the wearable device is to monitor the user.

* * * * *